(12) United States Patent
Miyake

(10) Patent No.: US 11,813,519 B2
(45) Date of Patent: Nov. 14, 2023

(54) MEDIUM, GAME EVENT PROCESSING SYSTEM, AND METHOD

(71) Applicant: SQUARE ENIX CO., LTD., Tokyo (JP)

(72) Inventor: Youichiro Miyake, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 17/453,708

(22) Filed: Nov. 5, 2021

(65) Prior Publication Data

US 2022/0134223 A1  May 5, 2022

(30) Foreign Application Priority Data

Nov. 5, 2020  (JP) ................. 2020-185396

(51) Int. Cl.
*A63F 13/216* (2014.01)
*A63F 13/44* (2014.01)
*A63F 13/45* (2014.01)
*A63F 13/69* (2014.01)
*A63F 13/847* (2014.01)

(52) U.S. Cl.
CPC ............ *A63F 13/216* (2014.09); *A63F 13/44* (2014.09); *A63F 13/45* (2014.09); *A63F 13/69* (2014.09); *A63F 13/847* (2014.09)

(58) Field of Classification Search
CPC ........ A63F 13/44; A63F 13/216; A63F 13/45; A63F 13/69; A63F 13/847
See application file for complete search history.

(56) References Cited

U.S. PATENT DOCUMENTS

| 2007/0243916 | A1* | 10/2007 | Lee ........................... A63F 9/24 463/9 |
| 2012/0142429 | A1* | 6/2012 | Muller .................... A63F 13/69 463/42 |
| 2018/0287848 | A1* | 10/2018 | Morishita ............... H04L 67/00 |
| 2019/0015747 | A1* | 1/2019 | Thompson .............. A63F 13/53 |
| 2020/0108309 | A1* | 4/2020 | Kidera .................. A63F 13/332 |

FOREIGN PATENT DOCUMENTS

| JP | 2009148483 A | 7/2009 |
| JP | 2020054451 A | 4/2020 |
| JP | 6745966 B1 | 8/2020 |

OTHER PUBLICATIONS

"Dragon Quest Walk official promotional site | Square Enix", Square Enix Co., et al., Ltd. with English translation https://www.dragonquest.jp/walk/ captured Oct. 27, 2021; pp. all.

Niantic, Inc. "Game—Ingress Prime" with English translation https://ingress.com/ja/game/ captured Oct. 27, 2021; pp. all.

(Continued)

*Primary Examiner* — Thomas H Henry
(74) *Attorney, Agent, or Firm* — Dorsey & Whitney LLP

(57) ABSTRACT

In an information processing apparatus, position information is obtained with respect to each of a plurality of players, a group made up of the plurality of players is created, and event data of a game event that can be played by the group, the event data including one or a plurality of individual conditions to be satisfied by a player, is generated based on the position information of the players.

19 Claims, 20 Drawing Sheets

(56) References Cited

OTHER PUBLICATIONS

"How to play 'Pokemon GO' | Play 'Pokemon GO'! | 'Pokemon GO' official site", The Pokémon Company, et al. with English translation https://www.pokemongo.jp/howto/play/#anc1 captured Oct. 27, 2021; pp. all.
Notice of Reasons for Rejection dated Nov. 16, 2021 for Japanese Patent Application No. 2020-185396; pp. all.

* cited by examiner

MEDIUM, GAME EVENT PROCESSING SYSTEM, AND METHOD

CROSS-REFERENCE TO RELATED APPLICATION(S)

This application claims priority to and the benefit of Japanese Patent Application No. 2020-185396, filed on Nov. 5, 2020, the disclosure of which is expressly incorporated herein by reference in its entirety for any purpose.

FIELD

At least one embodiment of the present disclosure relates to a program, an information processing apparatus, and a method for providing a game using position information.

BACKGROUND

Conventionally, various games which are set in augmented reality and which use position information of a player have been proposed. Examples of such techniques may be found in: Niantic, Inc. "Game—Ingress Prime", [retrieved: Jun. 10, 2020], Internet <URL:https://ingress.com/ja/game/>; The Pokémon Company, et. al., "How to play 'Pokemon GO'|Play 'Pokemon GO'!|'Pokemon GO' official site", [retrieved: Jun. 10, 2020], Internet <URL: https://www.pokemongo.jp/howto/play/#anc1>; and SQUARE ENIX CO., et. al., LTD. "Dragon Quest Walk official promotional site|SQUARE ENIX", [retrieved: Jun. 10, 2020], Internet <URL:https://www.dragonquest.jp/walk/>.

SUMMARY

Conventionally, various games which are set in the real world and which use position information of a player have been proposed and are referred to as location-based games. However, with conventional location-based games, although there is an element of indirect cooperation such as a plurality of players inflicting damage on and defeating an enemy arranged on a map or competing between sides which the players belong to, the players are not given individual roles within groups and a game experience as a member of a group to be provided to each player is tenuous.

An object of at least one embodiment of the present disclosure is to solve the problem described above and improve a game experience as a member of a group to be provided to a player.

From a non-limiting perspective, an aspect of the present disclosure is a program for enabling an information processing apparatus to execute: a player position information obtaining function of obtaining, with respect to each of a plurality of players, position information of the player in the real world; a group creating function of creating a group made up of the plurality of players; and an event data generating function of generating, based on position information of the plurality of players, event data of a game event that can be played by the group made up of the plurality of players, the event data including one or a plurality of individual conditions which is assigned to each player belonging to the group and which is to be satisfied by the player during game play.

Moreover, the present disclosure can also be comprehended as an information processing apparatus, an information processing system, a method executed by a computer, or a program which a computer is caused to execute. In addition, the present disclosure can also be comprehended as a recording of such a program on a recording medium that is readable by an apparatus such as a computer, a machine, or the like. In this case, a recording medium that is readable by a computer or the like refers to a recording medium which stores information such as data or a program by an electric action, a magnetic action, an optical action, a mechanical action, or a chemical action and which can be read by a computer or the like.

Each of the embodiments of the present application solves one or more deficiencies.

DESCRIPTION OF EMBODIMENTS

Hereinafter, embodiments of the present disclosure will be described with reference to the drawings. It should be noted that the embodiments described below merely represent examples of implementing the present disclosure and are not intended to limit the present disclosure to the specific configurations described below. When implementing the present disclosure, a specific configuration may be adopted as deemed appropriate in accordance with each embodiment.

In addition, the various components in the examples of the respective embodiments described below can be combined as deemed appropriate as long as no inconsistencies and the like arise from such combinations. Furthermore, a description of contents described as an example of a given embodiment may sometimes be omitted in other embodiments. In addition, contents of operations and processing that are unrelated to characteristic portions of each embodiment may sometimes be omitted. Furthermore, various processing steps that constitute various flows to be described below are in a random order as long as no inconsistencies and the like arise in contents of processing.

First Embodiment

Configuration of Apparatus

Figure 1:
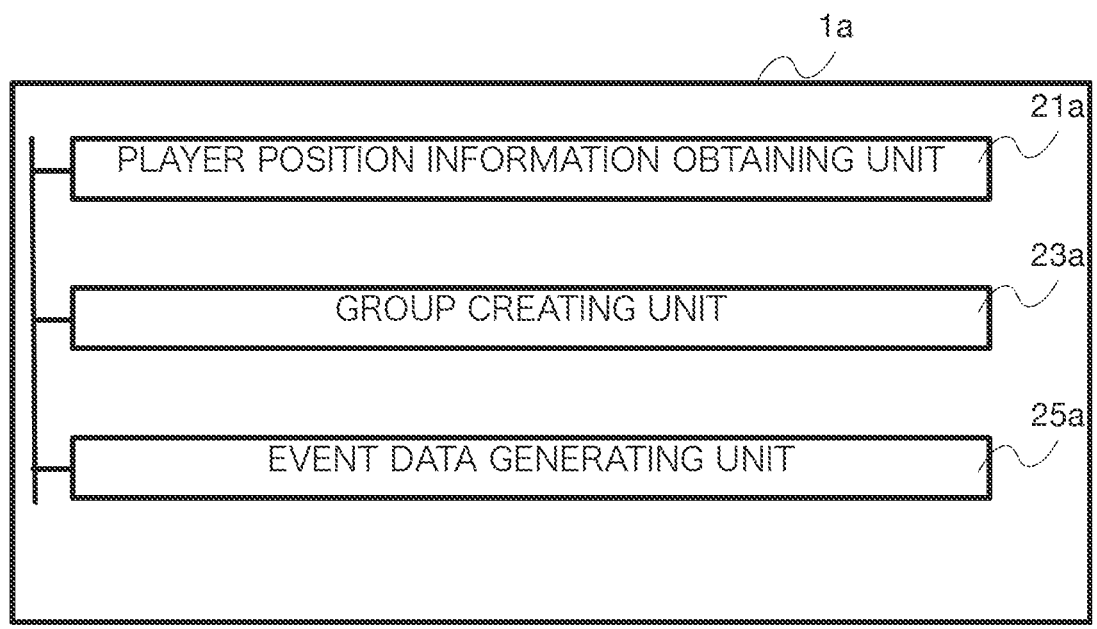
FIG. 1 is a diagram showing an outline of a functional configuration of an information processing apparatus that corresponds to at least one embodiment of the present disclosure.

FIG. 1 is a diagram showing an outline of a functional configuration of an information processing apparatus 1a according to the present embodiment. The information processing apparatus 1a according to the present embodiment functions as an information processing apparatus including a player position information obtaining unit 21a, a group creating unit 23a, and an event data generating unit 25a as one or a plurality of processors interpret and execute various programs having been deployed on various memories. While an example in which all of these functions are to be executed by a general-purpose processor will be described in the present embodiment, alternatively, a part of or all of the functions may be realized by one or a plurality of dedicated processors. In addition, each functional unit included in the information processing apparatus 1a may be implemented remotely and/or implemented in a distributed manner (for example, on the cloud). Furthermore, the functional units may be realized by a plurality of software modules instead of a single software module.

The player position information obtaining unit 21a obtains, with respect to each of a plurality of players, position information of the player in the real world.

The group creating unit 23a creates a group made up of the plurality of players.

The event data generating unit 25a generates, based on position information of the plurality of players, event data of a game event that can be played by the group made up of the plurality of players, the event data including one or a plurality of individual conditions which is assigned to each player belonging to the group and which is to be satisfied by the player during game play. In the present disclosure, an entirety of a series of events related to a game to be played by a group will be referred to as a "game event". It should be noted that a game event may be a part of a game having a more expansive world setting or having a spatial/temporal expanse. In addition, although an individual condition uses the term "individual" because an individual condition is set for each player, this does not mean that contents of conditions differ among the players.

Flow of Processing

Next, a flow of processing to be executed in the present embodiment will be described. It is to be understood that specific contents and processing sequences of the processing shown in the flow chart according to the embodiment merely represent one example of implementing the present disclosure. Specific processing contents and processing sequences may be selected as deemed appropriate in accordance with the embodiments of the present disclosure.

Figure 2:
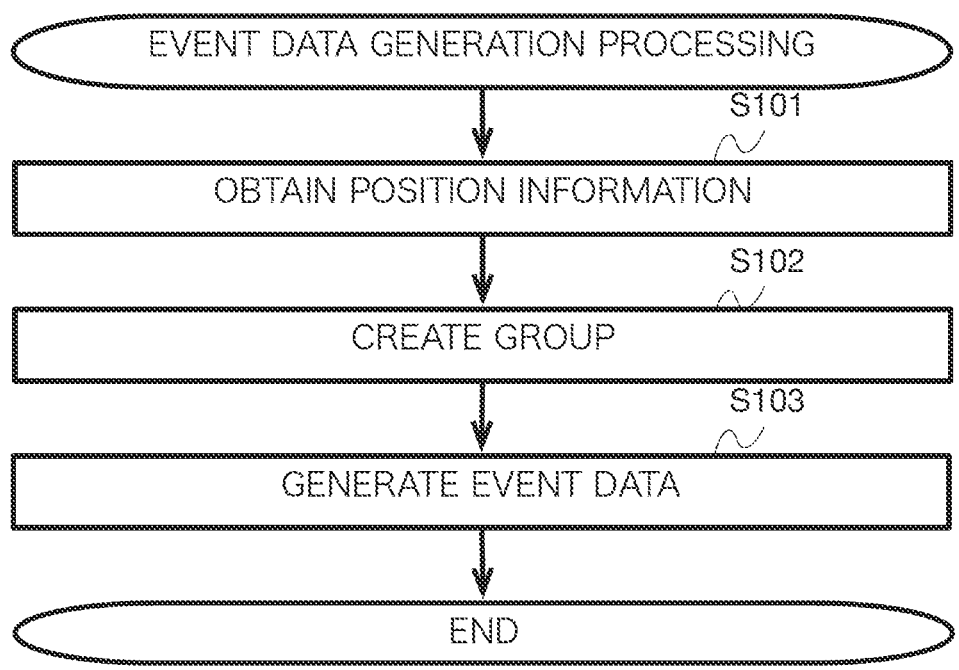
FIG. 2 is a flow chart showing a flow of event data generation processing that corresponds to at least one embodiment of the present disclosure.

FIG. 2 is a flow chart showing a flow of event data generation processing according to the first embodiment. In the event data generation processing according to the first embodiment, the player position information obtaining unit 21a obtains, with respect to each of a plurality of players, position information of the player (step S101), the group creating unit 23a creates a group including the plurality of players (step S102), and the event data generating unit 25a generates event data of a game event that can be played by the group created in step S102 (step S103).

As described above, as an aspect of the present disclosure, the information processing apparatus 1a includes the player position information obtaining unit 21a, the group creating unit 23a, and the event data generating unit 25a. Therefore, according to the aspect of the present disclosure, a game experience as a member of a group to be provided to a player can be improved.

Second Embodiment

Next, a second embodiment will be described. With respect to components and processing contents in common with the first embodiment, the first embodiment will be referred to and descriptions thereof will be omitted.

Configuration of Apparatus

Figure 3:
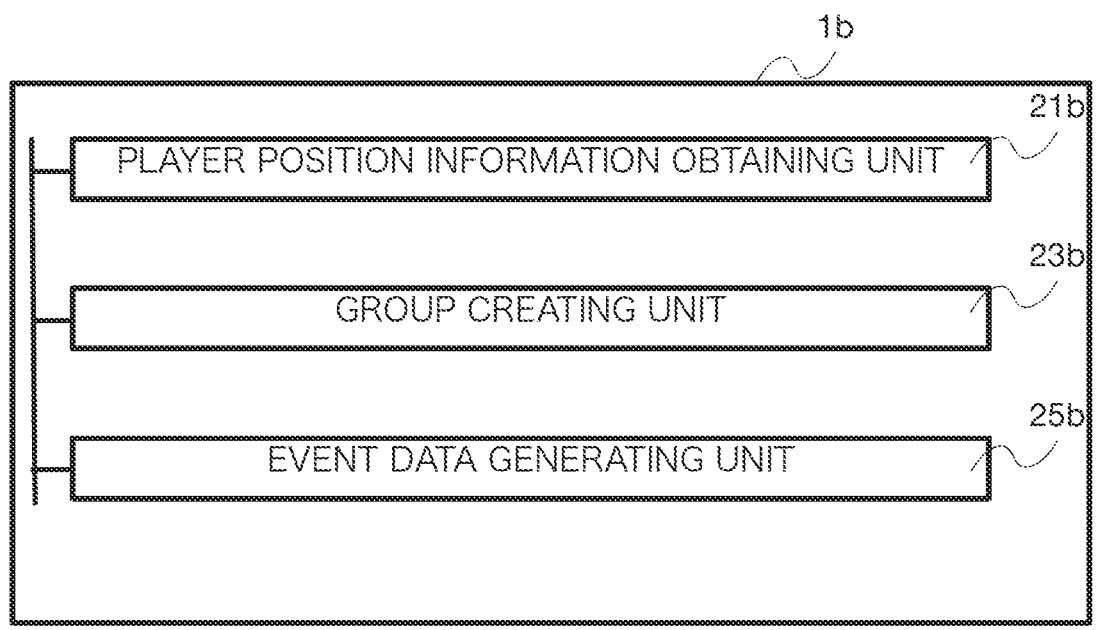
FIG. 3 is a diagram showing an outline of a functional configuration of an information processing apparatus that corresponds to at least one embodiment of the present disclosure.

FIG. 3 is a diagram showing an outline of a functional configuration of an information processing apparatus 1b according to the present embodiment. While the information processing apparatus 1b according to the present embodiment includes a player position information obtaining unit 21b, a group creating unit 23b, and an event data generating unit 25b in a similar manner to the first embodiment, contents of processing by the event data generating unit 25b differ from contents of processing described in the first embodiment.

In the second embodiment, the event data generating unit 25b generates event data including a player reaching a designated location in the real world as an individual condition.

Flow of Processing

Next, a flow of processing to be executed in the present embodiment will be described. It is to be understood that specific contents and processing sequences of the processing shown in the flow chart according to the embodiment merely represent one example of implementing the present disclosure. Specific processing contents and processing sequences may be selected as deemed appropriate in accordance with the embodiments of the present disclosure.

Figure 4:
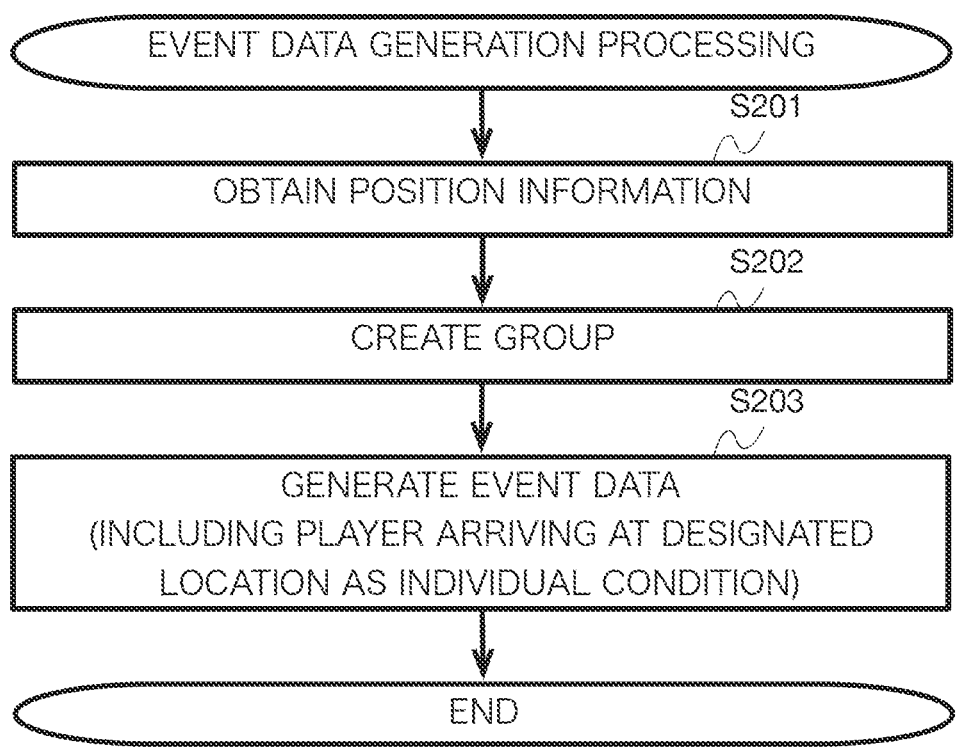
FIG. 4 is a flow chart showing a flow of event data generation processing that corresponds to at least one embodiment of the present disclosure.

FIG. 4 is a flow chart showing a flow of event data generation processing according to the second embodiment. In the event data generation processing according to the second embodiment, the player position information obtaining unit 21b obtains, with respect to each of a plurality of players, position information of the player (step S201), the group creating unit 23b creates a group including the plurality of players (step S202), and the event data generating unit 25b generates event data including a player reaching a designated location in the real world as an individual condition as event data of a game event that can be played by the group created in step S202 (step S203).

As described above, as an aspect of the present disclosure, the information processing apparatus 1b includes the player position information obtaining unit 21b, the group creating unit 23b, and the event data generating unit 25b, and the event data generating unit 25b generates event data including a player reaching a designated location in the real world as an individual condition. Therefore, according to the aspect of the present disclosure, a game experience accompanying moving in the real world as a member of a group can be provided.

Third Embodiment

Next, a third embodiment will be described. With respect to components and processing contents in common with the first embodiment, the first embodiment will be referred to and descriptions thereof will be omitted.

Configuration of Apparatus

Figure 5:
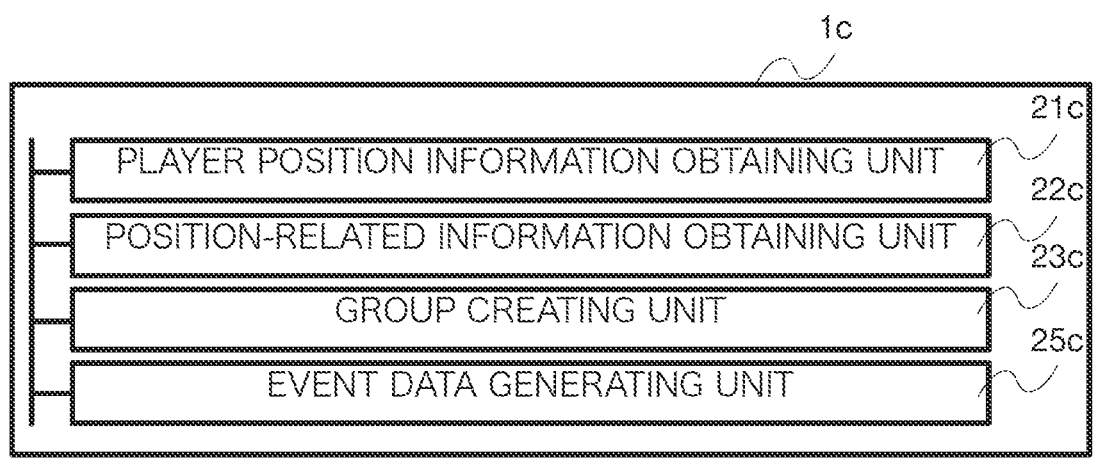
FIG. 5 is a diagram showing an outline of a functional configuration of an information processing apparatus that corresponds to at least one embodiment of the present disclosure.

FIG. 5 is a diagram showing an outline of a functional configuration of an information processing apparatus 1c according to the present embodiment. In addition to including a player position information obtaining unit 21c, a group creating unit 23c, and an event data generating unit 25c in a similar manner to the first embodiment, the information processing apparatus 1c according to the present embodiment includes a position-related information obtaining unit 22c. Furthermore, in the present embodiment, contents of processing by the event data generating unit 25c differ from contents of processing described in the first embodiment.

The position-related information obtaining unit 22c obtains, with respect to a position in the real world, information having a predetermined association with the position.

In addition, in the third embodiment, the event data generating unit 25c generates event data using information obtained by the position-related information obtaining unit 22c with respect to a position indicated by position information of a player.

Flow of Processing

Next, a flow of processing to be executed in the present embodiment will be described. It is to be understood that specific contents and processing sequences of the processing shown in the flow chart according to the embodiment merely represent one example of implementing the present disclosure. Specific processing contents and processing sequences may be selected as deemed appropriate in accordance with the embodiments of the present disclosure.

Figure 6:
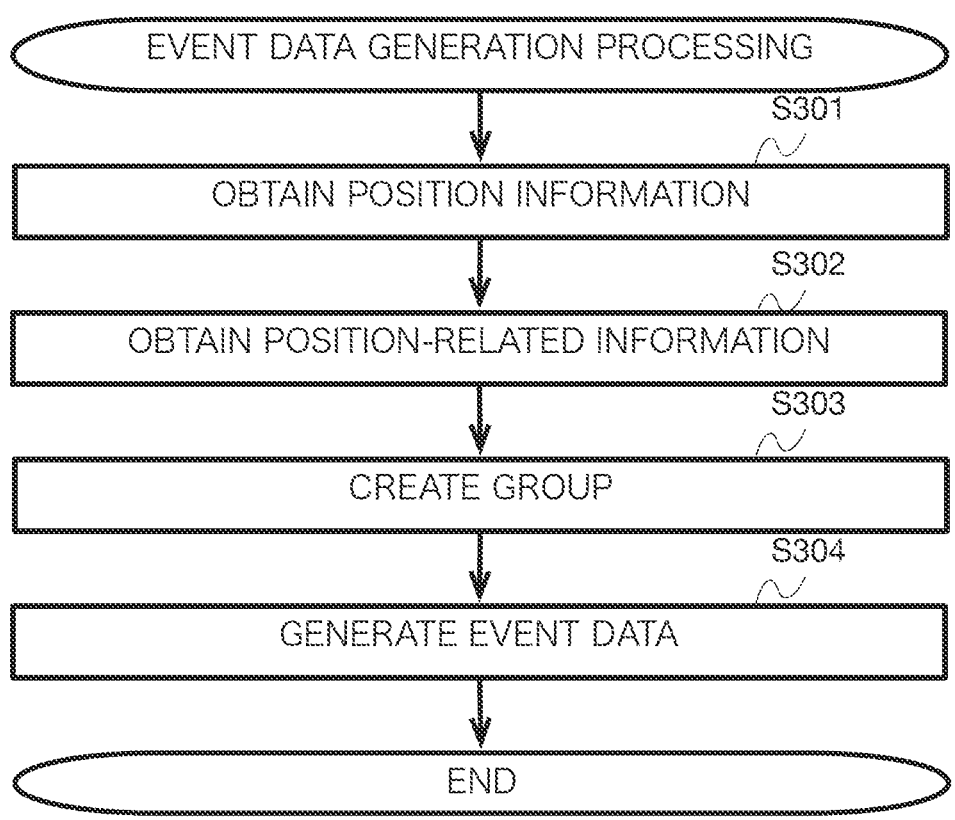
FIG. 6 is a flow chart showing a flow of event data generation processing that corresponds to at least one embodiment of the present disclosure.

FIG. 6 is a flow chart showing a flow of event data generation processing according to the third embodiment. In the event data generation processing according to the third embodiment, the player position information obtaining unit 21c obtains, with respect to each of a plurality of players, position information of the player (step S301), the position-related information obtaining unit 22c obtains, with respect to a position in the real world, information having a predetermined association with the position (step S302), the group creating unit 23c creates a group including the plurality of players (step S303), and the event data generating unit 25c generates event data of a game event that can be played by the group created in step S303 (step S304).

As described above, as an aspect of the present disclosure, the information processing apparatus 1c includes the player position information obtaining unit 21c, the position-related information obtaining unit 22c, the group creating unit 23c, and the event data generating unit 25c, and the event data generating unit 25c generates event data using information obtained by the position-related information obtaining unit 22c with respect to a position indicated by the position information of a player. Therefore, according to the aspect of the present disclosure, a game experience that enables a player to sense a stronger connection to the real world can be provided.

Fourth Embodiment

Next, a fourth embodiment will be described. With respect to components and processing contents in common with the first embodiment, the first embodiment will be referred to and descriptions thereof will be omitted.

Configuration of Apparatus

Figure 7:
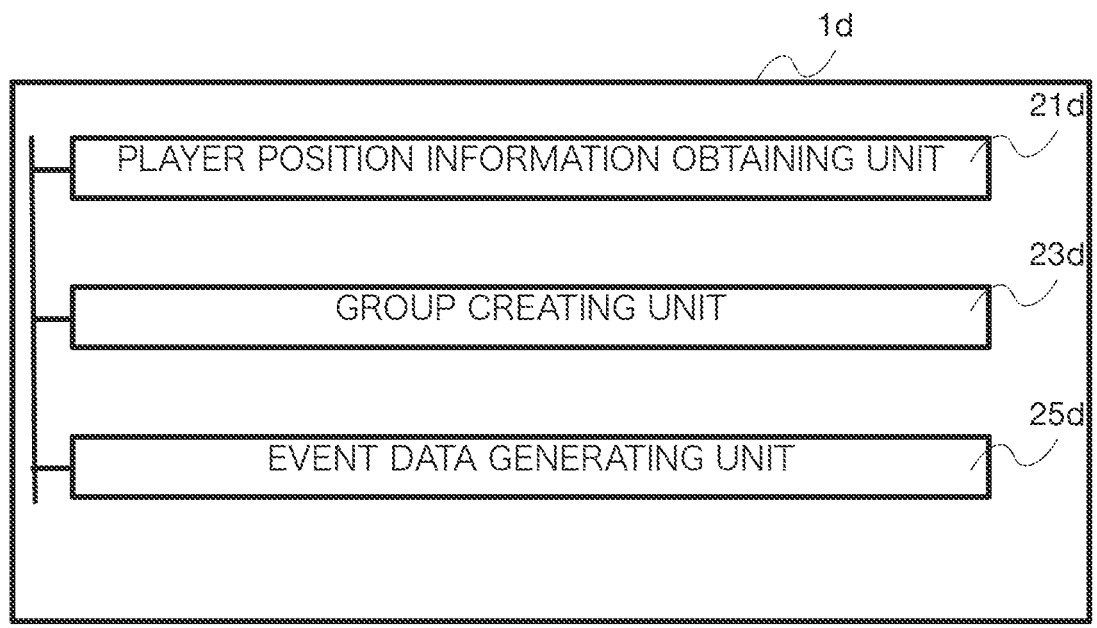
FIG. 7 is a diagram showing an outline of a functional configuration of an information processing apparatus that corresponds to at least one embodiment of the present disclosure.

FIG. 7 is a diagram showing an outline of a functional configuration of an information processing apparatus 1d according to the present embodiment. While the information processing apparatus 1d according to the present embodiment includes a player position information obtaining unit 21d, a group creating unit 23d, and an event data generating unit 25d in a similar manner to the first embodiment, contents of processing by the event data generating unit 25d differ from contents of processing described in the first embodiment.

In the fourth embodiment, the event data generating unit 25d generates event data including at least two or more players belonging to a group reaching a rendezvous point in the real world as an individual condition.

Flow of Processing

Next, a flow of processing to be executed in the present embodiment will be described. It is to be understood that specific contents and processing sequences of the processing shown in the flow chart according to the embodiment merely represent one example of implementing the present disclosure. Specific processing contents and processing sequences may be selected as deemed appropriate in accordance with the embodiments of the present disclosure.

Figure 8:
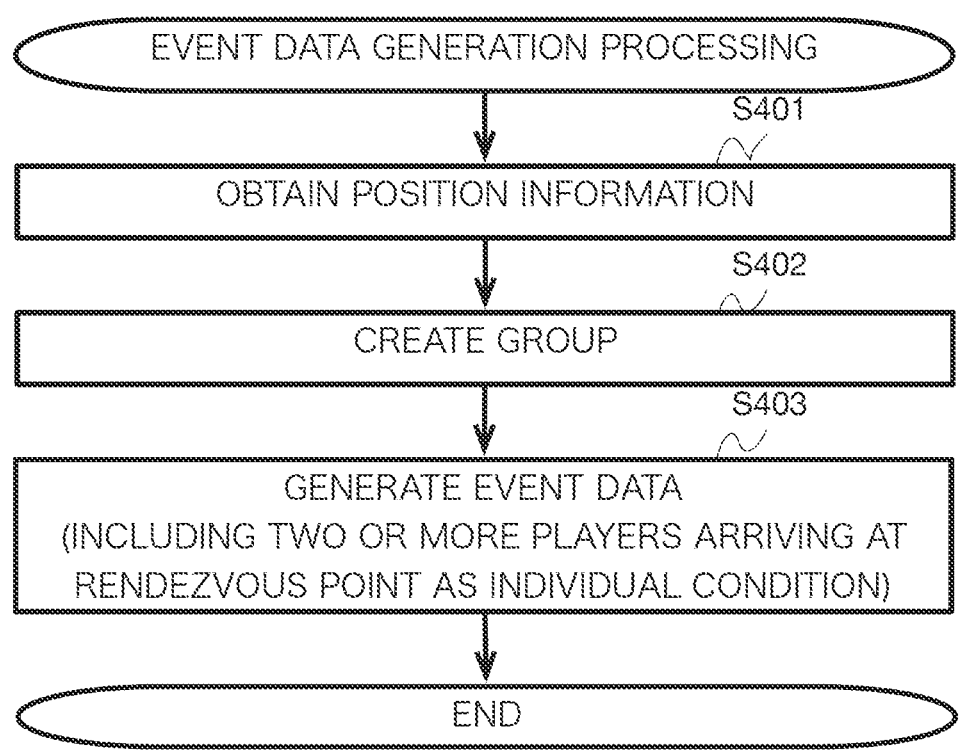
FIG. 8 is a flow chart showing a flow of event data generation processing that corresponds to at least one embodiment of the present disclosure.

FIG. 8 is a flow chart showing a flow of event data generation processing according to the fourth embodiment. In the event data generation processing according to the fourth embodiment, the player position information obtaining unit 21d obtains, with respect to each of a plurality of players, position information of the player (step S401), the group creating unit 23d creates a group including the plurality of players (step S402), and the event data generating unit 25d generates event data including at least two or more players belonging to the group created in step S402 reaching a rendezvous point in the real world as an individual condition as event data of a game event that can be played by the group (step S403).

As described above, as an aspect of the present disclosure, the information processing apparatus 1d includes the player position information obtaining unit 21d, the group creating unit 23d, and the event data generating unit 25d, and the event data generating unit 25d generates event data including at least two or more players belonging to a group reaching a rendezvous point in the real world as an individual condition. Therefore, according to the aspect of the present disclosure, a game experience including interaction between players in the real world can be provided.

Fifth Embodiment

Next, a fifth embodiment will be described. With respect to components and processing contents in common with the first embodiment, the first embodiment will be referred to and descriptions thereof will be omitted.

Configuration of Apparatus

Figure 9:
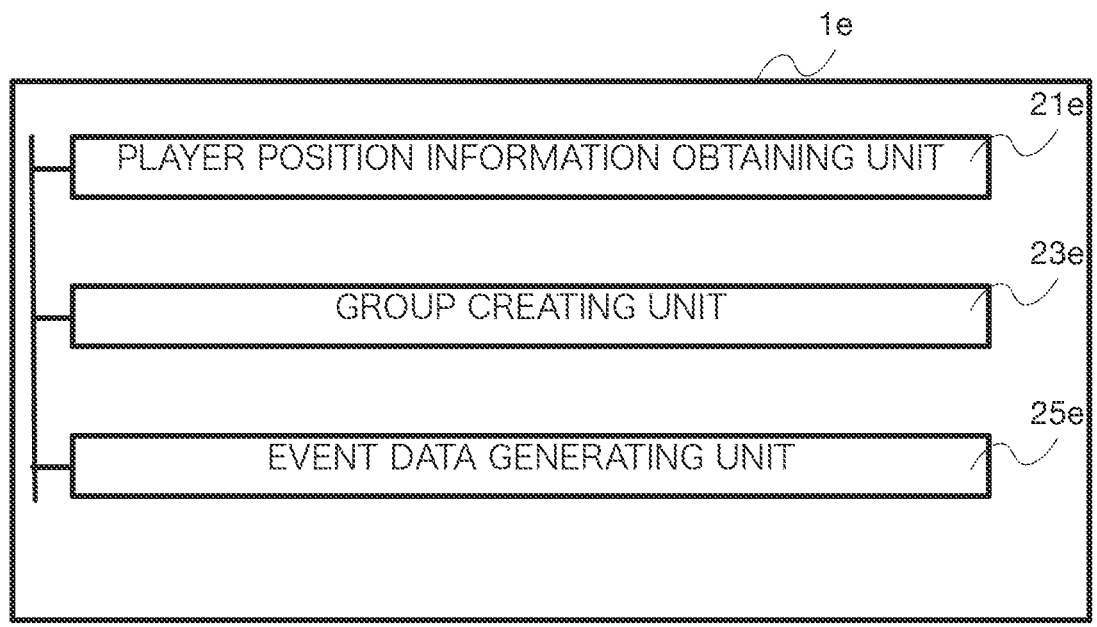
FIG. 9 is a diagram showing an outline of a functional configuration of an information processing apparatus that corresponds to at least one embodiment of the present disclosure.

FIG. 9 is a diagram showing an outline of a functional configuration of an information processing apparatus 1e according to the present embodiment. While the information processing apparatus 1e according to the present embodiment includes a player position information obtaining unit 21e, a group creating unit 23e, and an event data generating unit 25e in a similar manner to the first embodiment, contents of processing by the event data generating unit 25e differ from contents of processing described in the first embodiment.

In the fifth embodiment, the event data generating unit 25e changes contents of event data based on an elapsed time or a remaining time of a game event and present position information of a player.

Flow of Processing

Next, a flow of processing to be executed in the present embodiment will be described. It is to be understood that specific contents and processing sequences of the processing shown in the flow chart according to the embodiment merely represent one example of implementing the present disclosure. Specific processing contents and processing sequences may be selected as deemed appropriate in accordance with the embodiments of the present disclosure.

Figure 10:
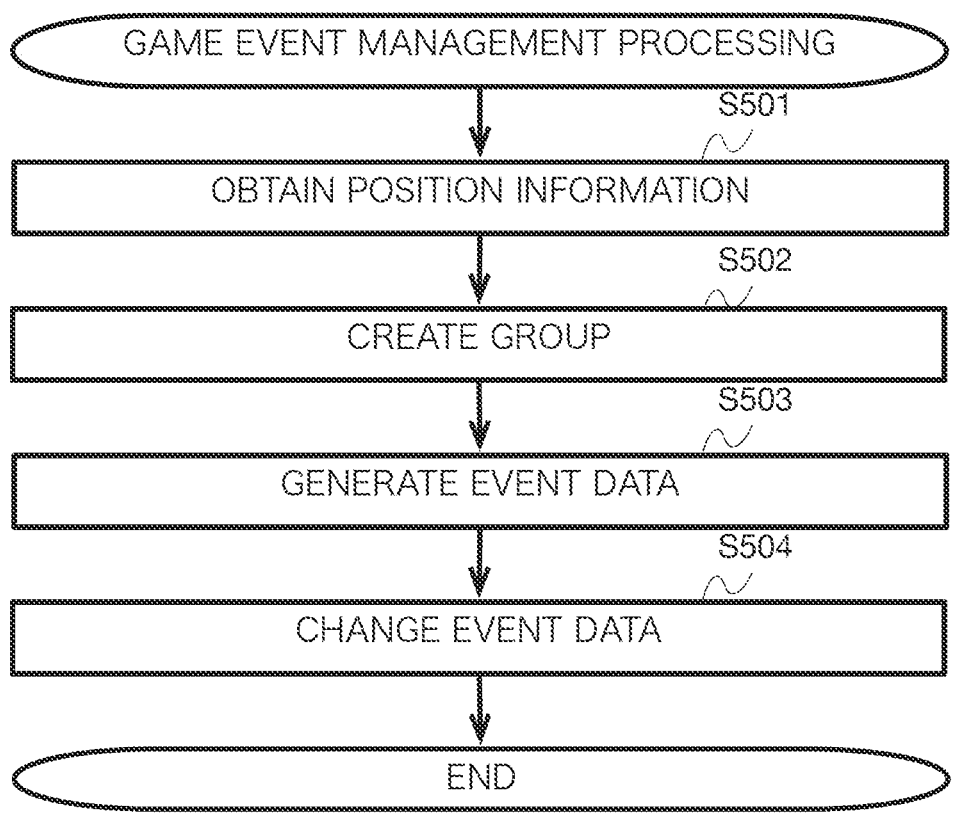
FIG. 10 is a flow chart showing a flow of game event management processing that corresponds to at least one embodiment of the present disclosure.

FIG. 10 is a flow chart showing a flow of game event management processing according to the fifth embodiment. In the game event management processing according to the fifth embodiment, the player position information obtaining unit 21e obtains, with respect to each of a plurality of players, position information of the player (step S501), the group creating unit 23e creates a group including the plurality of players (step S502), the event data generating unit 25e generates event data of a game event that can be played by the group created in step S502 (step S503), and the event data generating unit 25e changes contents of the event data based on an elapsed time or a remaining time of the game event and present position information of a player (step S504).

As described above, as an aspect of the present disclosure, the information processing apparatus 1e includes the player position information obtaining unit 21e, the group creating unit 23e, and the event data generating unit 25e, and the event data generating unit 25e changes contents of event data based on an elapsed time or a remaining time of a game event and present position information of a player. Therefore, according to the aspect of the present disclosure, a game experience in accordance with a player's situation can be provided.

Sixth Embodiment

Configuration of Apparatus

Figure 11:
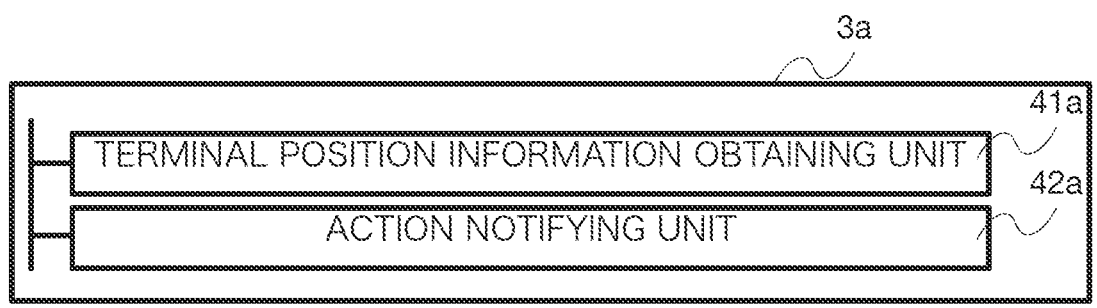
FIG. 11 is a diagram showing an outline of a functional configuration of a user terminal that corresponds to at least one embodiment of the present disclosure.

FIG. 11 is a diagram showing an outline of a functional configuration of a user terminal 3a according to the present embodiment. The user terminal 3a according to the present embodiment is a terminal apparatus to be used by a player belonging to a group made up of a plurality of players and functions as an information processing apparatus including a terminal position information obtaining unit 41a and an action notifying unit 42a as one or a plurality of processors interpret and execute various programs having been deployed on various memories. While an example in which all of these functions are to be executed by a general-purpose processor will be described in the present embodiment, alternatively, a part of or all of the functions may be realized by one or a plurality of dedicated processors. In addition, each functional unit included in the user terminal 3a may be implemented remotely and/or implemented in a distributed manner (for example, on the cloud). Furthermore, the functional units may be realized by a plurality of software modules instead of a single software module.

The terminal position information obtaining unit 41a obtains position information of a user terminal apparatus as position information of a player in the real world.

The action notifying unit 42a notifies, based on one or a plurality of individual conditions included in event data of a game event that can be played by a group to be satisfied by a player of the group during game play, an action that the player should take in the real world in order to satisfy the individual condition.

Flow of Processing

Next, a flow of processing to be executed in the present embodiment will be described. It is to be understood that specific contents and processing sequences of the processing shown in the flow chart according to the embodiment merely represent one example of implementing the present disclosure. Specific processing contents and processing sequences may be selected as deemed appropriate in accordance with the embodiments of the present disclosure.

Figure 12:
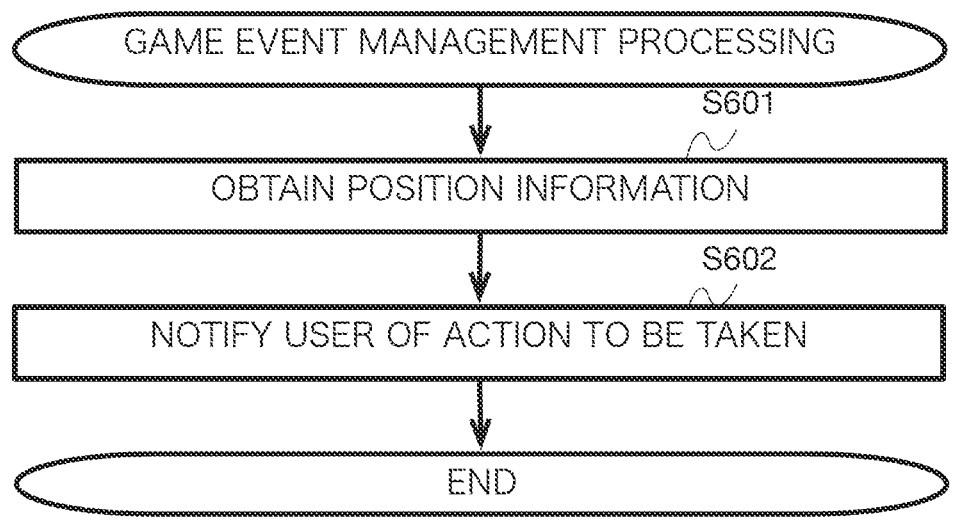
FIG. 12 is a flow chart showing a flow of game event management processing that corresponds to at least one embodiment of the present disclosure.

FIG. 12 is a flow chart showing a flow of game event management processing according to the sixth embodiment. In the game event management processing according to the sixth embodiment, the terminal position information obtaining unit 41a obtains position information of a user terminal apparatus as position information of a player in the real world (step S601), and the action notifying unit 42a notifies an action that the player should take in the real world in order to satisfy an individual condition (step S602).

As described above, as an aspect of the present disclosure, the user terminal 3a includes the terminal position information obtaining unit 41a and the action notifying unit 42a. Therefore, according to the aspect of the present disclosure, a game experience as a member of a group to be provided to a player can be improved.

Seventh Embodiment

Configuration of Apparatus

Figure 13:
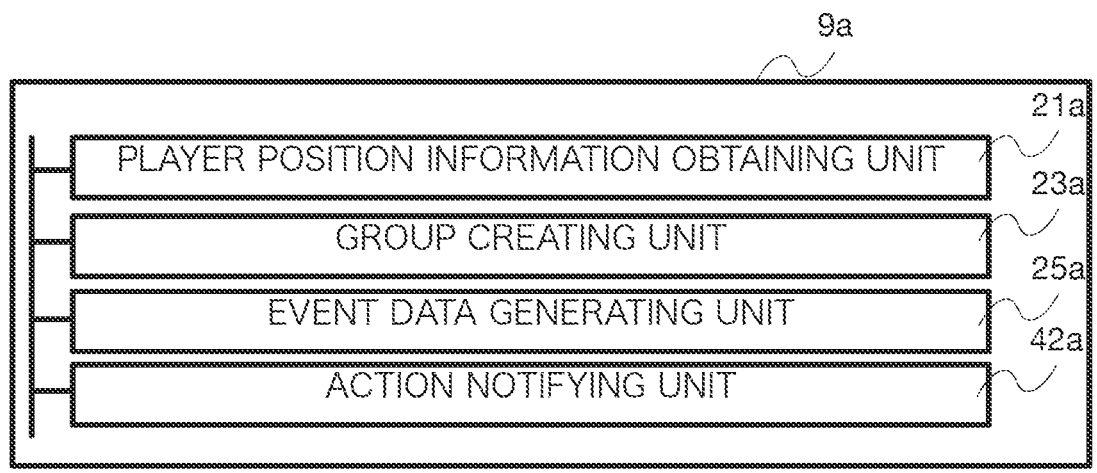
FIG. 13 is a diagram showing an outline of a functional configuration of a game event processing system that corresponds to at least one embodiment of the present disclosure.

FIG. 13 is a diagram showing an outline of a functional configuration of a game event processing system 9a according to the present embodiment. The game event processing system 9a according to the present embodiment is a game event processing system including a terminal apparatus to be used by a player belonging to a group made up of a plurality of players and an information processing apparatus that manages the group and functions as an information processing system including a player position information obtaining unit 21a, a group creating unit 23a, an event data generating unit 25a, and an action notifying unit 42a as one or a plurality of processors interpret and execute various programs having been deployed on various memories. While an example in which all of these functions are to be executed by a general-purpose processor will be described in the present embodiment, alternatively, a part of or all of the functions may be realized by one or a plurality of dedicated processors. In addition, each functional unit included in the game event processing system 9a may be implemented remotely and/or implemented in a distributed manner (for example, on the cloud). Furthermore, the functional units may be realized by a plurality of software modules instead of a single software module.

The player position information obtaining unit 21a obtains, with respect to each of a plurality of players, position information of the player in the real world.

The group creating unit 23a creates a group made up of the plurality of players.

The event data generating unit 25a generates, based on position information of the plurality of players, event data of a game event that can be played by the group made up of the plurality of players, the event data including one or a plurality of individual conditions which is assigned to each player belonging to the group and which is to be satisfied by the player during game play.

The action notifying unit 42a notifies each of the players belonging to the group of an action that the player should take in the real world in order to satisfy the individual condition.

Flow of Processing

Next, a flow of processing to be executed in the present embodiment will be described. It is to be understood that specific contents and processing sequences of the processing shown in the flow chart according to the embodiment merely represent one example of implementing the present disclosure. Specific processing contents and processing sequences may be selected as deemed appropriate in accordance with the embodiments of the present disclosure.

Figure 14:
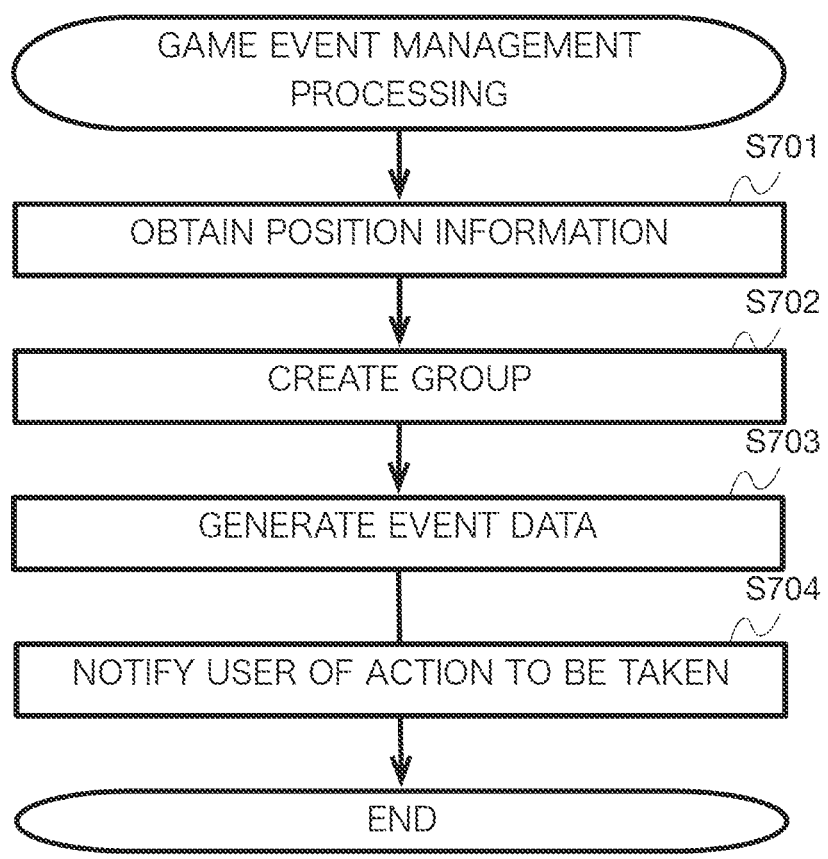
FIG. 14 is a flow chart showing a flow of game event management processing that corresponds to at least one embodiment of the present disclosure.

FIG. 14 is a flow chart showing a flow of game event management processing according to the seventh embodiment. In the game event management processing according to the seventh embodiment, the player position information obtaining unit 21a obtains, with respect to each of a plurality of players, position information of the player (step S701), the group creating unit 23a creates a group including the plurality of players (step S702), the event data generating unit 25a generates event data of a game event that can be played by the group created in step S702 (step S703), and the action notifying unit 42a notifies an action that the player should take in the real world in order to satisfy the individual condition (step S704).

As described above, as an aspect of the present disclosure, the game event processing system 9a includes the player position information obtaining unit 21a, the group creating unit 23a, the event data generating unit 25a, and the action notifying unit 42a. Therefore, according to the aspect of the present disclosure, a game experience as a member of a group to be provided to a player can be improved.

Eighth Embodiment

Configuration of Apparatus

Figure 15:
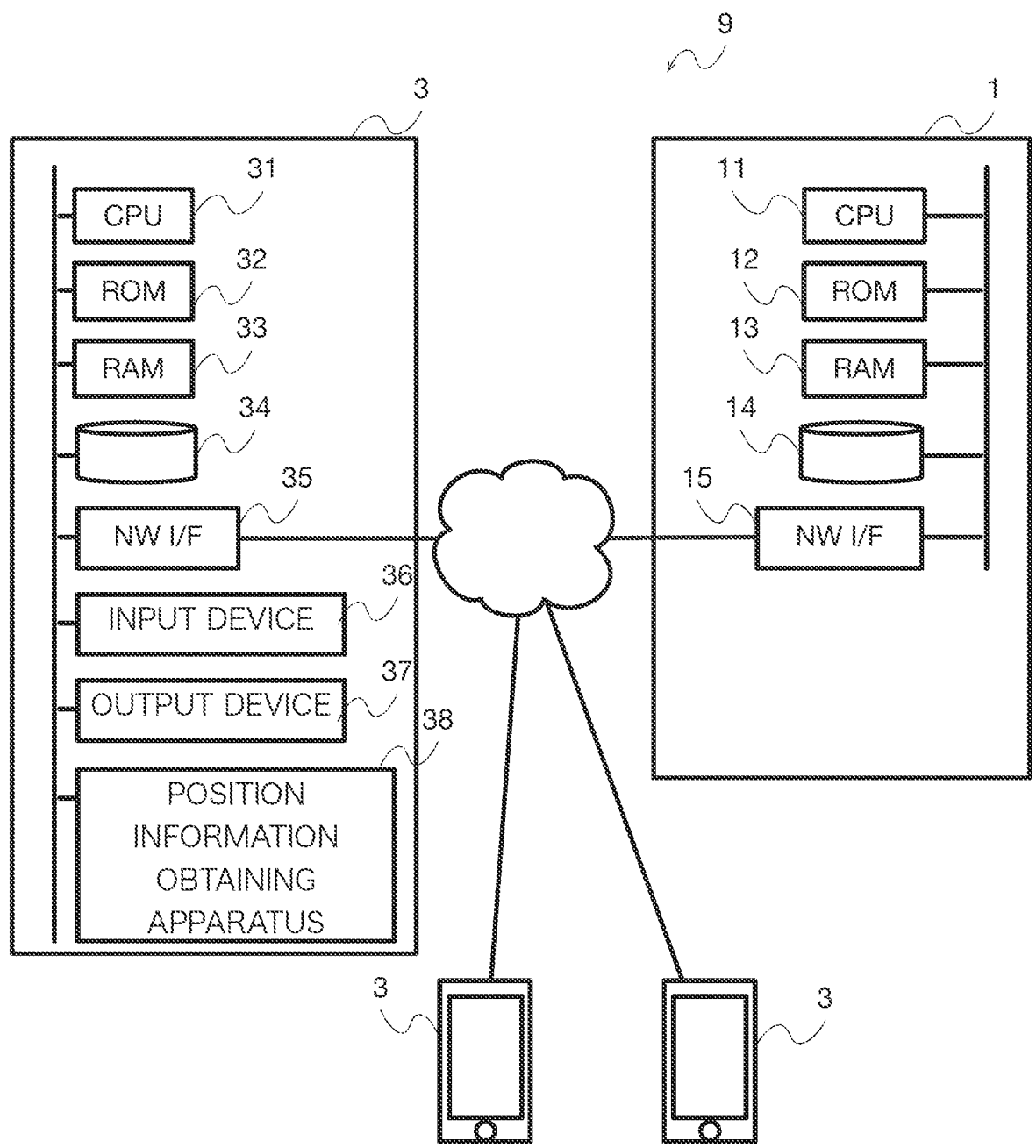
FIG. 15 is a diagram showing an outline of a configuration of an information processing system that corresponds to at least one embodiment of the present disclosure.

FIG. 15 is a diagram showing an outline of a configuration of an information processing system 9 according to the present embodiment. The information processing system 9 according to the present embodiment has an information processing apparatus 1 and a plurality of user terminals 3 which are connected to a network such as the Internet. The information processing apparatus 1 is a server 1 for a game which the plurality of user terminals 3 are to participate in. While examples of a game that is performed by having the plurality of user terminals 3 connect to the server 1 include games of various genres which enable a player to cooperate with, to compete against, and/or interact with (such as an MMORPG (Massively Multiplayer Online Role-Playing Game), games to which the technique according to the present disclosure can be applied are not limited to the example according to the present embodiment. In addition, the user terminal 3 is a game device or the like to be used by a user. While various types of devices can be used as the game device of which examples include a personal computer, a smartphone a mobile game device, a stationary game device, and a wearable electronic device (for example, a VR (Virtual Reality) headset or a smart watch), types of devices are not limited. The user can play a game by having the user terminal 3 and the information processing apparatus 1 execute game processing based on a game processing program.

The information processing apparatus 1 is an information processing apparatus in which a CPU (Central Processing Unit) 11, a ROM (Read Only Memory) 12, a RAM (Random Access Memory) 13, an auxiliary storage apparatus 14, and a network interface 15 for communicating with the outside via a network are connected to each other in a wired or wireless manner. It should be noted that, with respect to a specific hardware configuration of the information processing apparatus 1, components may be omitted, replaced, or added as deemed appropriate in accordance with embodiments.

The CPU 11 controls respective components included in the information processing apparatus 1 such as the RAM 13 and the auxiliary storage apparatus 14 by processing commands and data having been deployed on the ROM 12, the RAM 13, and the like. In addition, the RAM 13 is a main storage apparatus which is controlled by the CPU 11, and various commands and data are written into and read from the RAM 13. In other words, the CPU 11, the ROM 12, and the RAM 13 constitute a control unit of the information processing apparatus 1.

The auxiliary storage apparatus 14 is a nonvolatile storage apparatus, and mainly information that is desirably retained even after turning off the power of the information processing apparatus 1 such as an OS (Operating System) of the information processing apparatus 1 to be loaded to the RAM 13, various programs for executing processing to be described later, and various types of data to be used by the information processing apparatus 1 are written into and read from the auxiliary storage apparatus 14. For example, an EEPROM (Electrically Erasable Programmable ROM) or an HDD (Hard Disk Drive) can be used as the auxiliary storage apparatus 14.

The user terminal 3 is an information processing apparatus in which a CPU 31, a ROM 32, a RAM 33, an auxiliary storage apparatus 34, a network interface 35, an input device 36, an output device 37, and a position information obtaining apparatus 38 capable of obtaining position information by referring to a GPS (Global Positioning System) or a wireless LAN access point are connected to each other in a wired or wireless manner. It should be noted that, with respect to a specific hardware configuration of the user terminal 3, components may be omitted, replaced, or added as deemed appropriate in accordance with embodiments.

As the input device 36, various apparatuses including a button, a stick, a keyboard, a mouse, a trackball, a touch sensor, an acceleration sensor, an angular velocity sensor, a camera, a depth sensor, and a microphone can be adopted. As the output device 37, various apparatuses including a display, a speaker, an oscillator, and an LED can be adopted. In addition, the input device 36 and the output device 37 that displays related contents may be provided together by adopting a touch panel-added display.

Other than the exemplary auxiliary storage apparatus 14 of the information processing apparatus 1, a detachably mounted portable medium may be used as the auxiliary storage apparatus 34 of the user terminal 3. Examples of a portable medium include a card/cartridge-type medium such as a ROM, a CD (Compact Disc), a DVD (Digital Versatile Disc), and a BD (Blu-ray (registered trademark) Disc). An auxiliary storage apparatus constituted by a portable medium and a non-portable auxiliary storage apparatus may be used in combination with each other.

Figure 16:
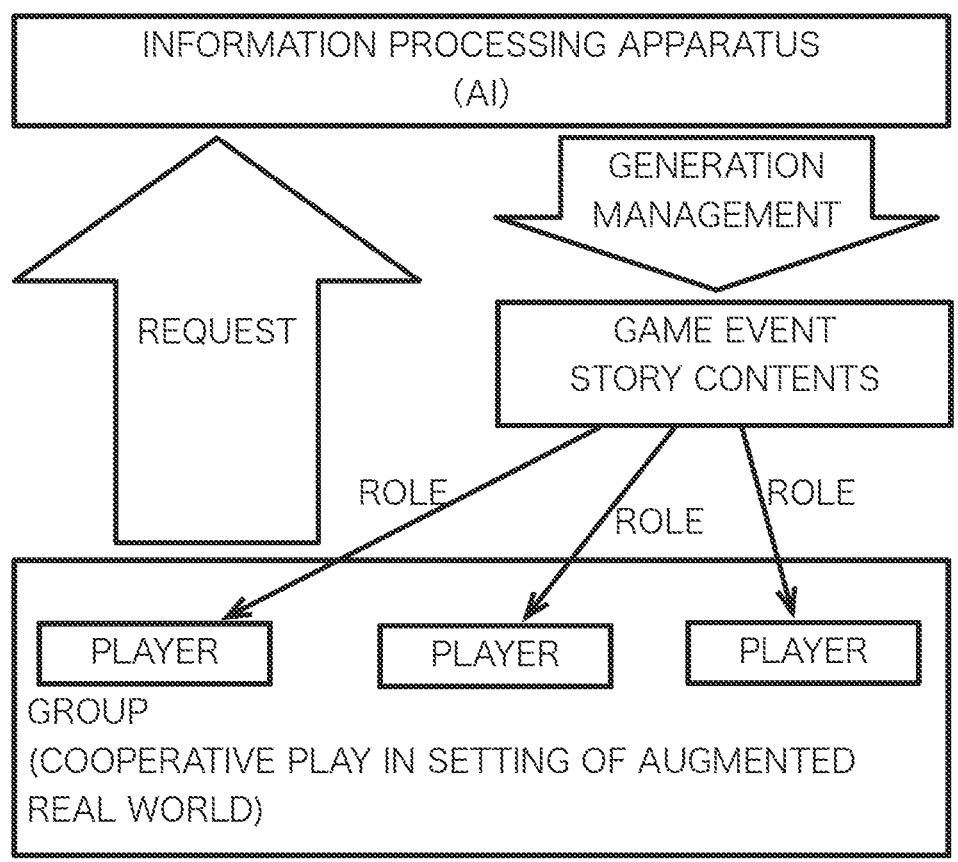
FIG. 16 is a diagram showing an example of an aspect in which a game event and story contents accompanying the game event are provided by a system that corresponds to at least one embodiment of the present disclosure.

FIG. 16 is a diagram showing an example of an aspect in which a system according to the present embodiment provides a game event and story contents accompanying the game event. The system according to the present embodiment is a system which uses AI (artificial intelligence) provided by the information processing apparatus 1 to automatically generate event data of a game event set in the real world (which may include a virtual world having been partially or entirely synchronized with the real world by augmentation) and story contents accompanying the game event, which provides a player belonging to a group with the generated event data and the story contents, and which further controls the game event and the story in order to enable the player to experience the game event. Story contents are contents accompanying a game event which include at least any of a text, a still image, a moving image, acoustics/music, and the like, and the system according to the present embodiment enables each player belonging to a group to leave a starting point (a workplace, home, a school, or another location) set for each player and experience a game event and story contents accompanying the game event having set in a region in the real world and having been generated by an AI. In this case, as the region in the real world which corresponds to the setting of the game event and the story, a wide variety of regions (for example, Tokyo, Japan, Asia, and the world) may be adopted in accordance with a scale of the story. For example, by generating a mission or a quest (which corresponds to an individual condition or a group condition to be described later) in accordance with a present position of each player and assigning the mission or the quest to the player, the AI gives each player a role in the game event/story.

To give a specific example, with the system according to the present embodiment, when three players (respectively in Ikebukuro, Shinjuku, and Shinagawa) having gotten off work at 19:00 open an application for the game according to the present embodiment on their respective user terminals 3 (smartphones or the like), position information of each player is transmitted to the information processing apparatus 1 together with a request to start the game, and the information processing apparatus 1 generates, in response to the request, event data of a game event and story contents accompanying the game event using the received position information and the like as input. For example, the game event/story may involve the player in Ikebukuro procuring a shield, the player in Shinjuku procuring a sword, and the player in Shinagawa procuring armor, the players traveling to and converging on Tokyo Tower that is likened to a stronghold of a boss in the story, and cooperating with each other to engage in a final battle.

However, the game event/story controlled by the system according to the present embodiment is not limited to the example described above. Games of various genres and stories of various styles may be adopted as the game event/story.

Figure 17:
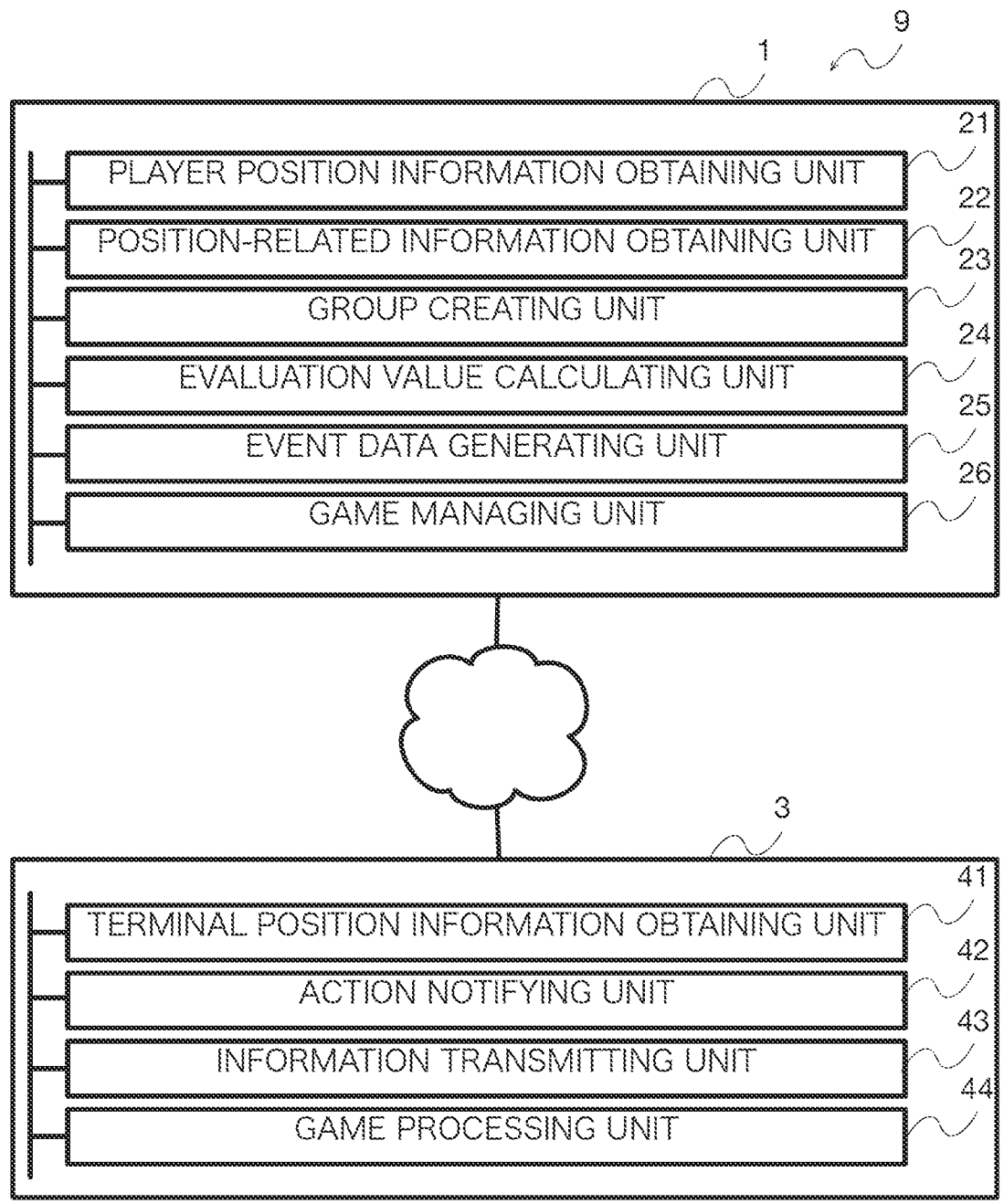
FIG. 17 is a diagram showing an outline of a functional configuration of an information processing apparatus that corresponds to at least one embodiment of the present disclosure.

FIG. 17 is a diagram showing an outline of a functional configuration of the information processing system 9 according to the present embodiment. The information processing apparatus 1 according to the present embodiment functions as a server 1 including a player position information obtaining unit 21, a position-related information obtaining unit 22, a group creating unit 23, an evaluation value calculating unit 24, an event data generating unit 25, and a game managing unit 26 as the CPU 11 interprets and executes various programs having been deployed on the ROM 12, the RAM 13, and the like. While an example in which all of these functions are to be executed by the general-purpose CPU 11 will be described in the present embodiment, alternatively, a part of or all of the functions may be realized by one or a plurality of dedicated processors. In addition, each functional unit included in the information processing apparatus 1 may be implemented remotely and/or implemented in a distributed manner (for example, on the cloud). Furthermore, the functional units may be realized by a plurality of software modules instead of a single software module.

The player position information obtaining unit 21 obtains, with respect to each player, position information of the player in the real world from the user terminal 3 of the player. However, the position information of the player may be obtained by a method other than obtaining from the user terminal 3 of the player. For example, the position information of the player may be detected by having a sensing apparatus (a camera or a microphone installed in the real world, a receiver that detects a predetermined signal emitted by the user terminal 3, or the like) other than the user terminal 3 detect the player or the user terminal 3 to be obtained by the information processing apparatus 1. Alternatively, by remotely operating a robot capable of moving in the real world, the player can participate in a game event without having to move by himself/herself. In this case, the position information of the robot is referred to as the position information of the player.

The position-related information obtaining unit 22 obtains, with respect to a position in the real world, information (hereinafter, referred to as "local information") having a predetermined association with the position by obtaining information on a region including the position or information on a region within a predetermined distance from the position. Local information may be obtained by searching a local information database prepared in advance using the position information as a key or by a map search or an Internet search by the AI using the position information as a key. In this case, for example, the local information includes a landmark, a specialty, local goods, a famous person from the region, a historical figure, a famous organization from the region, a location appearing in a piece of work such as a TV drama or anime (a so-called "sacred site"), a yuru-kyara (costumed mascot character), a station, a well-established store or restaurant, or a local character of a game or anime reminiscent of the locality. By obtaining such local information and using the local information to generate event data (to be described later), the system according to the present embodiment is capable of providing a game event (and a story or a user experience accompanying the game event) having been individualized in accordance with information of a location to be the setting of the game event. In the present embodiment, local information is associated with an attribute (for example, a place name, a landmark, a facility, a specialty, or a store or restaurant) of information to be used by the event data generating unit 25 (to be described later). The attribute of local information may be defined in advance in the local information database described above or estimated by the AI having performed the map search or the Internet search.

The group creating unit 23 creates a group made up of one or more players. In doing so, the group creating unit 23 may select players to be included in the group based on position information of the players obtained by the player position information obtaining unit 21. For example, when generating event data of a game event that includes players visiting/passing through/leaving a same point or a predetermined area as a condition, the group creating unit 23 can include players in vicinity of one another in a same group so that the condition is more readily satisfied. On the other hand, when generating event data of a game event that is concluded by players in a separated state without meeting each other, in order to provide a sense of togetherness among players who are physically separated from each other in the real world, the group creating unit 23 can include players as separated from each other as possible in a same group. In addition, a group need only include one or more players and may be made up of one player and a non-player character operated by the AI. The non-player character may be a robot capable of moving in the real world, a character drawn into an AR space by the user terminal 3, or a character appearing as an entity without substance in the real world.

The evaluation value calculating unit 24 calculates, based on information related to a group being an event data generation object, an evaluation value with respect to each of a plurality of pieces of data for event data generation stored in advance to be used by the event data generating unit 25 to generate event data. In this case, data for event data generation is data to be used as a raw material when generating event data and story contents and refers to data including at least any of an individual condition, a group condition, and contents (a text, a still image, a moving image, acoustics/music, and the like) for notifying a user of a mission, a story, or the like.

For example, the evaluation value calculating unit 24 calculates an evaluation value with respect to each of a plurality of sets of data for event data generation prepared in advance. Assuming that there are N-number of sets of event data prepared in advance as shown below, attribute information associated with event data and attribute information of the group are compared with each other and an evaluation value is calculated using a function that produces evaluation values such that the higher a degree of coincidence of attribute information, the higher the evaluation value. In this case, while attribute information of event data or a group may include, for example, the number of players belonging to the group, a positional relationship among the players (whether the players are close to each other or not), tastes of the players, ages, genders, game play history, or physical abilities, a type of attribute information to be used to calculate an evaluation value is not limited to that exemplified in the present embodiment. It should be noted that, as attribute information of a group, attribute information of a player obtained from each player can be aggregated to obtain the attribute information of the group.

Event data 1 (scenario of a final battle with a dragon: for players close to each other), Event data 2 (scenario of a final battle with a dragon: for players separated from each other), Event data 3 (scenario of playing tag: for players whose present positions are close to each other), Event data 4 (scenario of playing tag: for players whose running abilities are imbalanced),

. . .

Event data N (scenario of exploring a haunted house: for a large number of players, for players with a taste for horror).

The event data generating unit 25 generates event data and story contents of a game event that can be played by the group being the event data generation object based on data for event data generation, position information of a player, and local information of a region associated with the game event obtained by the position-related information obtaining unit 22. The local information used at this point is not limited to local information based on the position information of a player. For example, local information of a point that is likely to appear as a destination or a transit point in the game event may also be used. In doing so, the event data generating unit 25 preferentially uses data for event data generation for which a higher evaluation value has been calculated by the evaluation value calculating unit 24 among the plurality of pieces of data for event data generation stored in advance to generate event data of a game event that can be played by the object group. With the system according to the present embodiment, generating event data by preferentially using data for generation with a higher evaluation value enables an appropriate game event (and a story and a user experience accompanying the game event) to be matched with the group.

In addition, in the present embodiment, the event data generating unit 25 sets mutually different in-game roles to the respective players belonging to the group in the event data. In this case, an in-game role refers to an assignment of, for example, an in-game job or a role to be shared within a party (such as obtaining a designated item or traveling to a designated location).

An example of means for generating event data/story contents to be adopted in the present embodiment will now be described. In the present embodiment, event data/story contents are generated using a fill-in-the-blank method of generating a story by filling in empty parts of a template prepared in advance which represents a flow of a game from start to end of the game event. In this case, for example, a start, an end, and in-between story (scenario) branches of a story such as each player leaving a start point (for example, a village in a game world) to defeat a final boss (for example, a dragon in the game world) are determined in advance, and a scenario (route) from the start point to the end point is created by filling in the empty parts of a template of the scenario. When a fill-in-the-blank method is used as means to generate event data/story contents, a template representing a flow prepared in advance from start to end of the game event (including branches of a scenario) corresponds to data for event data generation. However, a specific configuration of data for event data generation is not limited to that exemplified in the present embodiment. As the data for event data generation, for example, element data (a content material with blank spaces, an antecedent condition for the element data to be connected, and an action including a consequence condition to be achieved by the element data and the like) to be connected by so-called automated planning and scheduling may be used.

In the present embodiment, a template of a game event is constructed by connecting in advance, in a similar manner to a flow chart, one or a plurality of sub-events to make up the game event which represents an entire series of events related to the game. In addition, each sub-event includes a content material and a group condition/individual condition. For example, template data of a story including information such as that described below is prepared in advance, and the event data generating unit 25 generates event data/story contents by filling in blank parts of such template data based on information such as local information having been obtained for each group. In this case, while only texts are exemplified as content materials for the sake of brevity, an actual content material may include a still image, a moving image, acoustics/music, and the like.

Story step S1:

Content material: "Warrior (player P1), it is said that the Shield of (landmark) is in (place name 1). You must go to (place name 1)".

Individual condition: When "Warrior (player P1) does not possess the Shield of (landmark) & Warrior (player P1) is in (place name 1)" is satisfied, advance to story step S2.

Story step S2:

Content material: "You have arrived in (place name 1). Photograph (landmark) and obtain the Shield of (landmark)".

Individual condition: When "Warrior (player P1) possesses the Shield of (landmark)" is satisfied, advance to story step S3.

Story step S3:

Content material: "You have now obtained the Shield of (landmark). Warrior (player P1), rendezvous with Wizard (player P2) of (place name 2) and Priest (player P3) of (place name 3) and proceed towards (facility name), the castle of (enemy character)".

Individual condition: When "Warrior (player P1) possesses the Shield of (landmark) & Warrior (player P1) is at (facility name) & (character) has not been defeated" is satisfied, advance to story step S4.

A parenthesized portion in the template is a replacement object which is a section to be replaced with information such as local information having been obtained for each group and which indicates an attribute of information to be used in the replacement. Event data including conditions and story contents for each group is obtained by replacing the replacement objects with local information having an attribute designated as replacement objects. For example, when a campaign to defeat an enemy character "Demon Lord" has been launched, three players Alice, Bob, and Carol respectively in Ikebukuro, Shinjuku, and Shinagawa have simultaneously made a start request of a game event, and the position-related information obtaining unit 22 has obtained pieces of local information of "Ikebukuro" as place name 1, "Shinjuku" as place name 2, "Shinagawa" as place name 3, "Ikefukurow" as a landmark, and "Tokyo Tower" as a facility name, by filling the parenthesized portions based on these pieces of information, event data and story contents accompanying the event data such as those described below are generated: "Warrior Alice, it is said that the Shield of Ikefukurow is in Ikebukuro. You must go to Ikebukuro".→"You have arrived in Ikebukuro. Photograph Ikefukurow and obtain the Shield of Ikefukurow".→"You have now obtained the Shield of Ikefukurow. Warrior Alice, rendezvous with Wizard Bob of Shinjuku and Priest Carol of Shinagawa and proceed towards Tokyo Tower, the castle of Demon Lord". Although taking a photograph of a predetermined object in the real world with a camera built into the user terminal 3 is adopted as an action to be taken by a player in order to obtain an in-game item in the present embodiment, contents of the action to be taken by a player in order to obtain an in-game item is not limited to the contents exemplified in the present disclosure.

Figure 18:
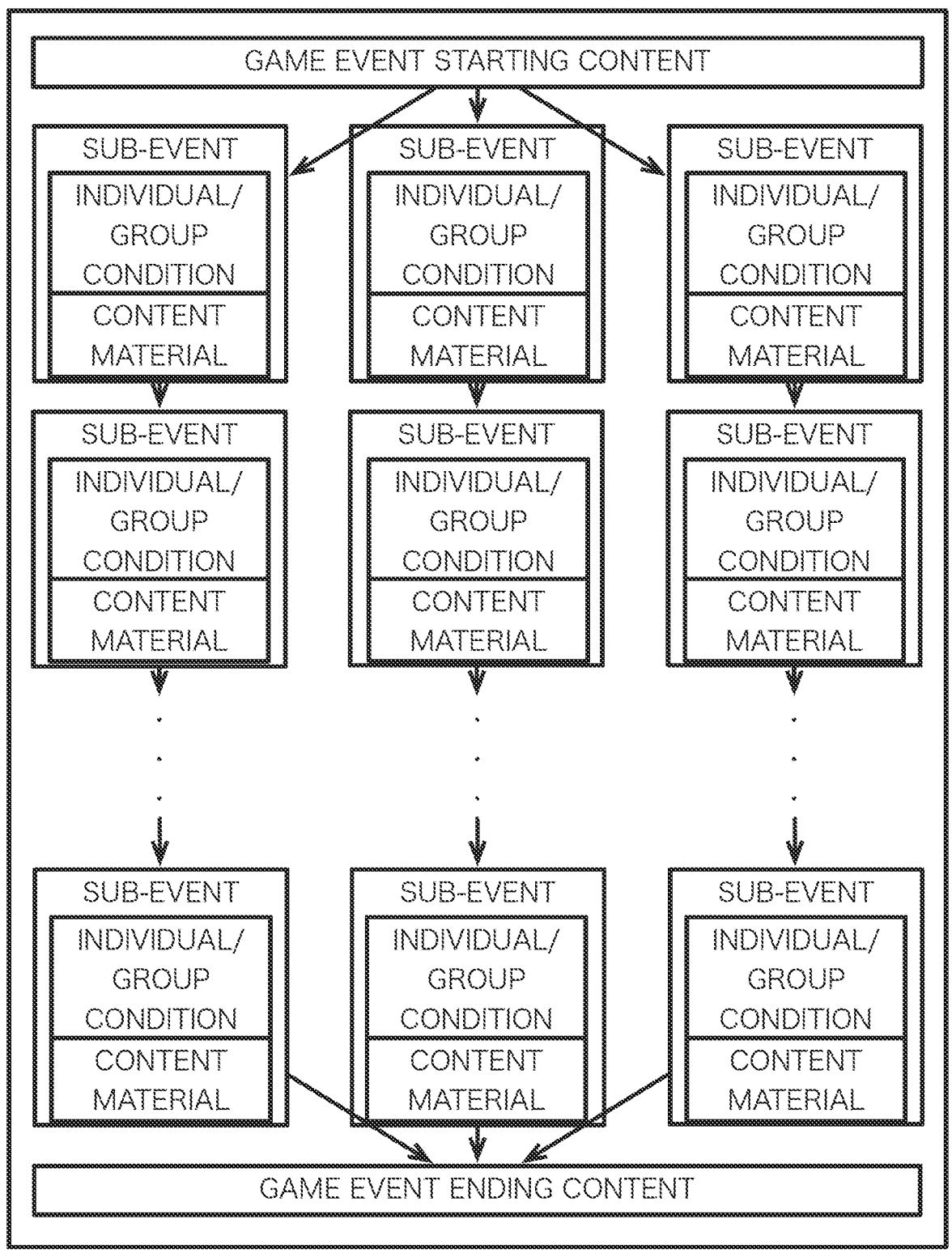
FIG. 18 is a diagram showing an example of a data structure of event data/story contents that corresponds to at least one embodiment of the present disclosure.

FIG. 18 is a diagram showing an example of a data structure of event data/story contents that are generated in the present embodiment. In the present embodiment, event data includes one or a plurality of individual conditions which is assigned to each player belonging to a group and which is to be satisfied by the player during game play, one or a plurality of group conditions to be satisfied by the group during game play, and story contents generated based on information on a player belonging to the group. In FIG. 18, since a structure of event data/story contents created using the fill-in-the-blank method is shown, a content material related to each sub-event completed by fill-in-the-blank corresponds to a story content. In the example shown in FIG. 18, as a template, a different scenario progress is prepared for each player belonging to the group. In this case, templates are prepared in the same number as the number of players belonging to the group. In other words, three players worth of templates are prepared in advance with respect to event data for three player-play or four players worth of templates are prepared in advance with respect to event data for four player-play are prepared in advance and stored in the auxiliary storage apparatus 14 or the like. Furthermore, scenario progress of each player may refer to a player progress status of another player. In other words, in a condition of player P1 achieving an individual condition, a position or an individual condition achievement status of another player may be referred to. Moreover, with respect to scenarios (routes) from a start point to an end point, even if the start point and the end point are the same, a plurality of scenarios or a scenario that branches depending on how a condition is achieved can be created by preparing branch routes of the scenario in advance or replacing the template with another depending in the situation. By preparing such branch routes, for example, when an individual condition cannot be achieved within a predetermined time, the scenario can branch off to a rescue scenario such as changing to another individual condition that will be more readily achieved or a plurality of scenarios that enable a player to enjoy different experiences depending on the player's choice can be provided.

An individual condition need only be some kind of condition that a player must satisfy in game play and contents and types of individual conditions are not limited. In a game, an individual condition may be presented as a mission, a quest, or the like to be achieved by the player to which the individual condition has been assigned. Mutually different individual conditions may be set to players belonging to the same group or a common individual condition may be set to two or more players. In addition, for example, a time limit may be set to an individual condition. Specifically, in a same time slot, a punitive mission/quest of Middle Boss 1 may be set to player P1, an acquisition mission/quest of a key item in the story may be set to player P2, and a travel mission/quest to a predetermined location may be set to player P3. Furthermore, a game event/story may include a mission/quest that involves two or more players belonging to the group converging at one location and taking a designated action (for example, engaging in battle with a boss). When the automated planning and scheduling method described earlier is to be used as means for generating event data/story contents, by assigning a consequence condition of element data to a player, the consequence condition becomes an individual condition to be satisfied by the player to which the consequence condition is assigned.

For example, an individual condition may be "a player reaching a designated location in the real world" or "at least obtaining an item that can be obtained when the player reaches the designated location". In addition, an action that is required of the player in order to satisfy an individual condition at the designated location is not limited to that exemplified in the present disclosure. Other examples of actions required of the player in order to satisfy an individual condition at the designated location include "subduing a middle boss", "meeting someone (a player character, a non-player character, or a person/character not participating in the game event)", "answering a question", "uttering a password", "relaying a message to someone", and "saying a prayer". In doing so, the event data generating unit 25 may determine the designated location based on position information of players obtained by the player position information obtaining unit 21. The position information of a player referred to in order to determine the designated location at this point is, for example, position information immediately before/immediately after the start of an event. However, as will be described later, since the designated location may be changed during a game in accordance with latest position information of a player, a progress status of the game, or the like, a timing of acquisition of position information is not limited. Although a determination of whether or not a player has reached the designated location is made based on the position information of the player in the present embodiment, a detection of arrival at the designated location need not be dependent on the position information of a player. For example, the detection of arrival at the designated location may be performed using other methods such as operating a predetermined apparatus at the designated location or getting photographed by a camera at the designated location.

In addition, the event data generating unit 25 may generate an individual condition including a same location as a designated location with respect to each of at least two or more players belonging to the group. Hereinafter, a location designated as a designated location with respect to two or more players will be particularly referred to as a "rendezvous point". In other words, in this case, the event data generating unit 25 generates event data including at least two or more players belonging to a group reaching a rendezvous point in the real world as an individual condition. Accordingly, event data of a game event can be generated which includes two or more players converging at a same location and taking action in order to satisfy an individual condition or a group condition (while an example is engaging in battle with a boss, contents and types of the action are not limited).

A group condition need only be some kind of condition that must be satisfied in game play as a group and contents and types of group conditions are not limited. In a game, a group condition may be presented as a mission, a quest, or the like to be achieved by the group to which the group condition is assigned. In addition, as described above, a group condition may be set in plurality with respect to a single game event by a single group. For example, a first group condition of defeating a final boss at the designated location or the rendezvous point and a second group condition of, after achieving the first group condition, performing an additional event for imparting a lingering sensation to the story such as receiving a reward or taking part in an end-of-story ceremony or viewing end credits may be set. When the automated planning and scheduling method described earlier is to be used as means for generating event data/story contents, the group condition is a condition imposed on every player belonging to the group and, at the same time, a condition to be simultaneously achieved by every player belonging to the group. For example, while "reaching a predetermined location" is not always simultaneously achieved and is therefore an individual condition, since "defeating a final boss" is imposed on everyone in order to clear an event and is to be simultaneously achieved, "defeating a final boss" is a group condition.

The game managing unit 26 advances a game event by managing achievement statuses of group conditions and individual conditions included in event data. In this case, when a group condition or an individual condition is not satisfied within a time limit set with respect to the group condition or the individual condition, the game managing unit 26 causes the event data generating unit 25 to change the group condition, the individual condition, or another individual condition.

In addition, the user terminal 3 according to the present embodiment functions as the user terminal 3 which is used by a player belonging to a group and which includes a terminal position information obtaining unit 41, an action notifying unit 42, an information transmitting unit 43, and a game processing unit 44 as the CPU 31 interprets and executes various programs having been deployed on the ROM 32, the RAM 33, and the like. While an example in which all of these functions are to be executed by the general-purpose CPU 31 will be described in the present embodiment, alternatively, a part of or all of the functions may be realized by one or a plurality of dedicated processors. In addition, each functional unit included in the user terminal 3 may be implemented remotely and/or implemented in a distributed manner (for example, on the cloud). Furthermore, the functional units may be realized by a plurality of software modules instead of a single software module.

The terminal position information obtaining unit 41 obtains position information of the user terminal 3 as position information of a player in the real world.

The action notifying unit 42 notifies, based on one or a plurality of individual conditions included in event data of a game event that can be played by a group to be satisfied by a player of the group during game play, an action that the player should take in the real world in order to satisfy the individual condition.

The information transmitting unit 43 transmits information which includes position information of a player obtained by the terminal position information obtaining unit 41 and sensing information and which enables a progress status of an action by the player to be comprehended to an information processing apparatus that manages a group to which the player belongs.

The game processing unit 44 executes game processing in cooperation with the game managing unit 26 of the information processing apparatus 1 while communicating with the game managing unit 26.

Flow of Processing

Next, a flow of processing to be executed in the present embodiment will be described. It is to be understood that specific contents and processing sequences of the processing shown in the flow chart according to the embodiment merely represent one example of implementing the present disclosure. Specific processing contents and processing sequences may be selected as deemed appropriate in accordance with the embodiments of the present disclosure.

Figure 19:
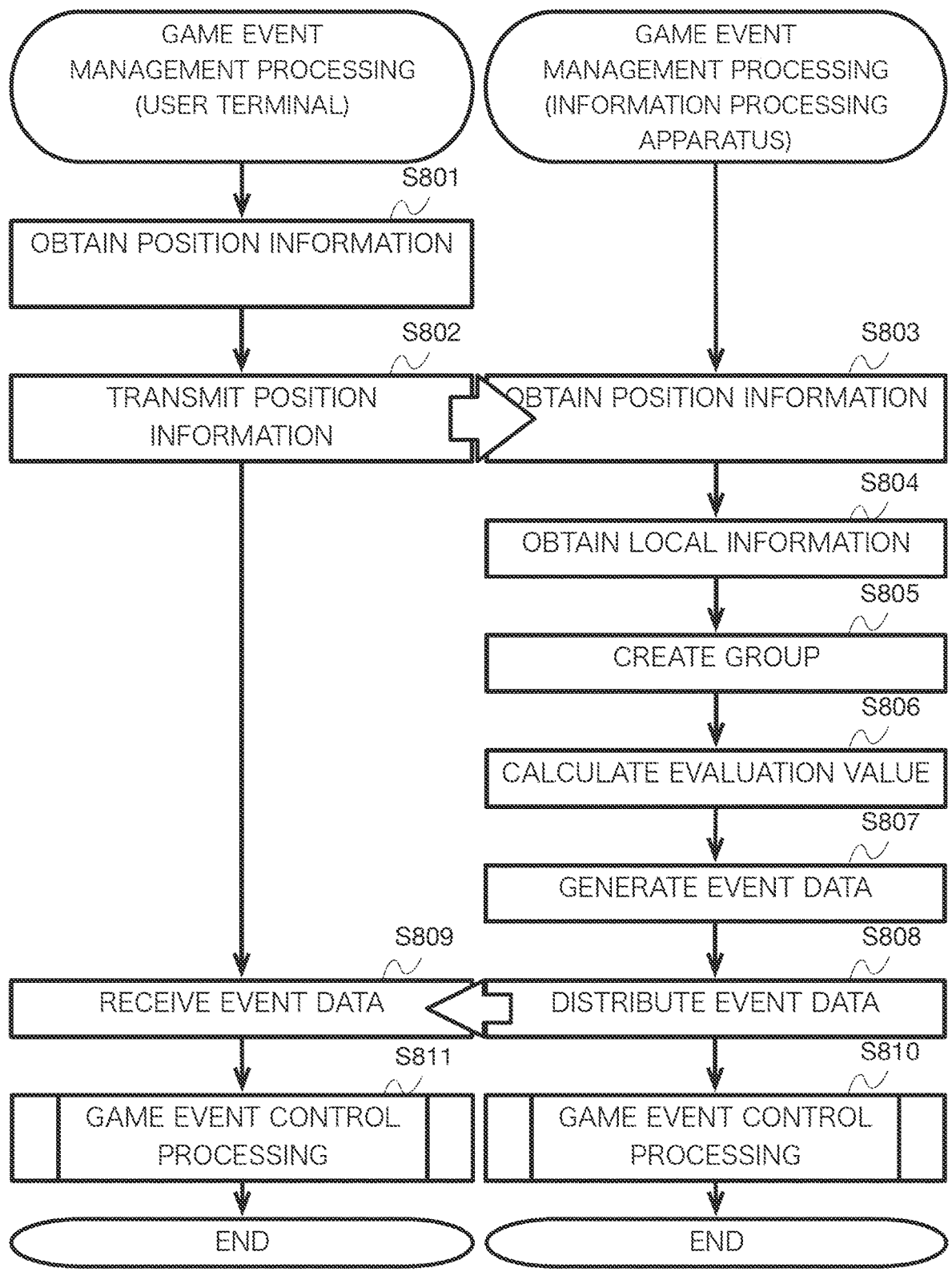
FIG. 19 is a flow chart showing a flow of game event management processing that corresponds to at least one embodiment of the present disclosure.

FIG. 19 is a flow chart showing a flow of game event management processing according to the eighth embodiment. Execution of processing shown in the present flow chart is triggered by a detection of an operation by a player in order to participate in a game event on the user terminal 3.

From steps S801 to S803, position information is obtained. The terminal position information obtaining unit 41 of the user terminal 3 obtains position information of the user terminal 3 as position information of a player in the real world (step S801), and the information transmitting unit 43 transmits the obtained position information of the player to the information processing apparatus (step S802). When there are a plurality of participating user terminals 3, processing of steps S801 and S802 are to be executed for each user terminal 3, and the player position information obtaining unit 21 is to obtain, for each player, the position information of the player transmitted from the user terminal 3 of the player (step S803). Subsequently, the processing advances to step S804.

In step S804, local information is obtained. The position-related information obtaining unit 22 obtains, based on the position information obtained in step S803, local information having a predetermined association with a position of the player by obtaining information on a region including the position indicated by the position information or information on a region within a predetermined distance from the position. Subsequently, the processing advances to step S805.

In step S805, a group is created. The group creating unit 23 creates a group including one or more players by selecting players to be included in the group based on the position information obtained in step S803. Subsequently, the processing advances to step S806.

In step S806, an evaluation value is calculated. The evaluation value calculating unit 24 calculates, based on information related to the group created in step S805, an evaluation value with respect to each of a plurality of pieces of data for event data generation stored in advance. Subsequently, the processing advances to step S807.

From step S807 to step S809, event data and story contents are generated. The event data generating unit 25 generates event data and story contents of a game event that can be played by the group created in step S805 based on data for event data generation, position information of a player belonging to the object group, and local information obtained in step S804 (step S807). Since details of generation of event data/story contents are as described earlier in the description of the event data generating unit 25, a description thereof will be omitted. The generated event data/story contents are distributed to the user terminals 3 of all of the players belonging to the object group (step S808) and received by the user terminals 3 having received the distribution (step S809). Subsequently, the processing advances to step S810.

In steps S810 and S811, the game event is started and game event processing is executed. The game processing unit 44 of the user terminal 3 having received the distribution of the event data/story contents in step S809 and the game managing unit 26 of the information processing apparatus 1 execute game processing related to the game event by communicating with each other to synchronize necessary information. Subsequently, the processing shown in the present flow chart is ended.

Figure 20:
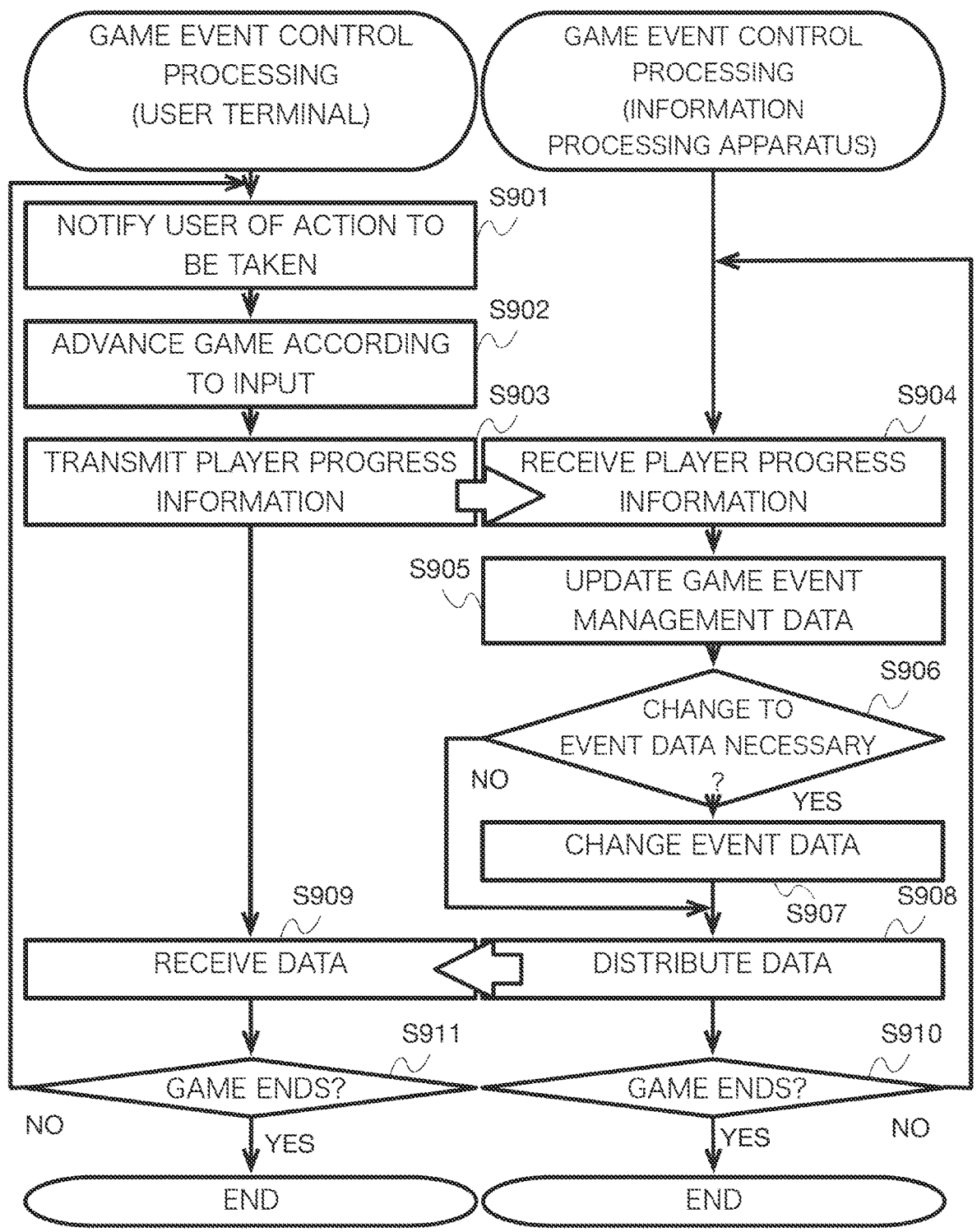
FIG. 20 is a flow chart showing a flow of game event control processing that corresponds to at least one embodiment of the present disclosure.

FIG. 20 is a flow chart showing a flow of game event control processing according to the eighth embodiment. The processing shown in the present flow chart corresponds to steps S810 and S811 of the game event management processing described with reference to FIG. 19. When there are a plurality of participating user terminals 3, the processing shown in the present flow chart is to be executed by each user terminal 3.

In steps S901 to S903, game processing is advanced by the user terminal 3. Based on latest event data received in step S809 of the game event management processing or in step S909 to be described later, the action notifying unit 42 of the user terminal 3 notifies an action to be taken in the real world for the player related to the user terminal 3 in order to satisfy the individual condition (in other words, contents of a mission/quest that is imposed on the player) (step S901). The user terminal 3 advances the game based on various inputs including a user input obtained by an input device included in the user terminal 3 and position information obtained by the terminal position information obtaining unit 41 (step S902). In addition, the information transmitting unit 43 transmits information that enables a progress status of the game by the player to be comprehended (hereinafter, referred to as "player progress information": the information includes the latest position information of the player obtained in step S902) to the information processing apparatus 1 (step S903). Subsequently, the processing advances to step S904.

In steps S904 and S905, game event management data is updated. The game managing unit 26 and the player position information obtaining unit 21 of the information processing apparatus 1 obtains, for each player, player progress information of the player (including the latest position information of the player obtained in step S902) having been transmitted from the user terminal 3 of the player (step S904). The game managing unit 26 updates game event management data for managing achievement statuses of group conditions and individual conditions included in the event data based on the information obtained in step S904, and advances the game event (step S905). Subsequently, the processing advances to step S906.

In steps S906 and S907, a progress status of the game event is determined based on information received from the user terminal 3 and the event data/story contents are changed when necessary. The game managing unit 26 determines whether or not the event data/story contents need to be changed by determining whether or not the group conditions and the individual conditions included in the game event are proceeding while time limits and the like set to the conditions are being appropriately satisfied based on the player progress information of each player received in step S904 (step S906). In this case, when it is determined that a group condition or an individual condition is not satisfied within the time limit set with respect to the group condition or the individual condition (NO in step S906), the event data generating unit 25 changes the event data/story contents (step S907). Subsequently, the processing advances to step S908.

In the present embodiment, the event data generating unit 25 changes contents of the event data/story contents during progress of the game event based on various parameters included in player progress information or game event management data at each time point. In this case, an achievement status of a group condition/an individual condition, an elapsed time or a remaining time of a game event, present position information of a player, and the like may be adopted as the various parameters included in player progress information or game event management data. Adopting such a configuration enables, for example, the information processing apparatus 1 as a meta AI that controls an entire game event to perform a role of a game master in a so-called TRPG (Tabletop Role-Playing Game) and appropriately change contents of event data/story contents based on a situation in the game at each time point while the game event is in progress, and enables an appropriate story or a user experience accompanying the event data to be provided.

More specifically, in the present embodiment, in accordance with an achievement status of a group condition/individual condition, the event data generating unit 25 is to: (1) "change a difficulty of the condition"; (2) "change a designated location of the condition"; or (3) "add a condition or delete the condition itself". For example, when the first condition is "obtain a weapon W1 that is highly effective against a specific enemy E1 at a first designated location within a time limit" and a subsequent second condition is "defeat enemy E1 at a second designated location" but the game managing unit 26 (to be described later) detects that the first condition has not been achieved (for example, due to running out of time), the game managing unit 26 requests the event data generating unit 25 to change the event data/story contents.

At this point, when (1) "change a difficulty of the condition" is adopted, the event data generating unit 25 makes it easier to defeat enemy E1 by lowering the difficulty of enemy E1 (for example, lowering defensive power, lowering HP, making it easier to inflict damage using other weapons, changing enemy E1 to a weaker enemy E2, or changing a difficulty setting prepared in advance from NORMAL to EASY). In addition, when (2) "change a designated location of the condition" is adopted, the event data generating unit 25 changes the first designated location in the first condition to a present location of a user or a vicinity thereof and makes it easier to obtain weapon W1 by extending the time limit by a predetermined time. Furthermore, when (3) "add a condition or delete the condition itself" is adopted, the event data generating unit 25 permits the player to advance the game (for example, by undertaking a next group condition/individual condition) by deleting the second condition and adding a different condition. For example, when a condition of obtaining a sword has not been achieved, a subsequent mission is changed on the premise of a state where a sword has not been obtained so that enemy E1 can be defeated even without a sword.

As described above, a designated location may be changed during a game in accordance with latest position information of a player, a progress status of the game, or the like. The event data generating unit 25 changes the designated location related to the player based on an elapsed time or a remaining time of a game event and present position information of the player. According to the present embodiment, by having such a configuration, based on latest position information of the player, a progress status of the game, or the like, the designated location can be moved to a location that is closer to or farther from the latest position of the player. In addition, the event data generating unit 25 may change the designated location related to the player based on an achievement status of a mission/quest or other information. For example, the event data generating unit 25 may add, with succeeding a mission/quest as a trigger, an extra mission/quest having a different designated location or add, with failing a mission/request as a trigger, a mission/quest having a different designated location and a lower level of difficulty.

When using the method of automated planning and scheduling described earlier as means for generating event data/story contents, contents of the event data/story contents can be changed by unchaining element data (releasing a chain of the element data) including a condition that is a deletion object and re-chaining element data having a different condition (enemy HP, venue, or the like).

In steps S908 and S909, various types of data are distributed from the information processing apparatus 1 to the user terminal 3. The game event management data updated in step S905 and/or the event data/story contents changed in step S907 is distributed to all user terminals 3 belonging to the object group (step S908) and received by the user terminals 3 of the players belonging to the object group (step S909). Subsequently, the processing advances to steps S910 and S911.

In steps S910 and S911, a continuation or a termination of the game event is determined. At this point, when the game event is to be terminated by any reason such as the game event achieving a termination condition (for example, achieving all group conditions) or an instruction to terminate the game event being input from the user terminal 3, the processing shown in the present flow chart ends. On the other hand, when the game event is to be continued, processing by the user terminal 3 returns to step S901 and processing by the information processing apparatus 1 returns to step S904. In other words, the processing shown in the present flow chart is repetitively executed until the game event ends.

As described above, each of the embodiments according to the present application solves one or more deficiencies. It should be noted that effects produced by each embodiment are non-limiting effects or examples of effects.

Other Variations

The embodiments described above merely represent examples of implementing the present disclosure and are not intended to limit the present disclosure to the specific configurations described above. When implementing the present disclosure, a specific configuration may be adopted as deemed appropriate in accordance with each embodiment.

While the technique according to the present disclosure has been described using an example of a multi-player computer game in the eighth embodiment, a game to which the technique according to the present disclosure can be applied may be a single-player game. In addition, a genre of games to which the technique according to the present disclosure can be applied is also not limited. Besides a so-called roll playing game, the technique according to the present disclosure can be applied to games of all types including an action game, a simulation game, a shooting game, a puzzle game, a card game, and a board game.

In addition, while an example in which event data/story contents are changed when it is determined that a condition is not satisfied within a time limit has been described in the eighth embodiment, other criteria may be adopted as a trigger for changing event data/story contents. For example, event data/story contents may be changed so that the game is more readily advanced when an attempt to achieve a condition fails for a predetermined number of (for example, three) times or more or event data/story contents may be changed so that advancing the game becomes more difficult when a condition is satisfied within a time limit (for example, when the condition is satisfied faster than anticipated).

In addition, while an example in which event data/story contents are generated mainly using a fill-in-the-blank method has been described in the eighth embodiment, other means may be adopted as means for generating event data/story contents. For example, as means of generating a text, a method of generating a sentence involving extracting/predicting a word from material data such as an individual condition and/or a group condition and fitting the word into a template or a method involving extracting/predicting a word from material data and generating a sentence using a language model can be adopted. In doing so, a model having machine-learned a correspondence relationship between a sample word and corresponding material data can be used to predict a word. As another method, a model having machine-learned a correspondence relationship between SVO having been extracted/predicted from material data and a sample sentence to which embroidery or rhetoric has been applied can also be used. Furthermore, with respect to types of game events of which a main flow of a story has been determined to a certain degree, a text may be prepared for main portions of the story and a text may be generated by fitting a word extracted from the material data into the template text. In addition, a text may be generated by combining a plurality of methods (which may include the methods exemplified above or may constitute of methods that have not been exemplified).

Using such methods enable a text to be generated which is not a simple conversion of necessary information into a sentence but which is a text that can be appreciated as a story since embroidery and rhetoric that cannot be directly derived from material data on its own have been added using a template or a machine learning model.

In addition, the text to be generated may be adjusted in accordance with a weight for each piece of material data. For example, a text may be generated using material data having a weight that is equal to or heavier than a predetermined weight. However, the method of using a weight is not limited to the selection of material data. The event data generating unit 25 may generate a text using all pieces of material data.

Furthermore, the event data generating unit 25 can adjust, for each piece of material data, at least any of a length and diction of each portion which corresponds to the material data among the text to be generated. In this case, diction refers to, for example, a style of writing based on words and phrases, wording, rhetoric, and the like. In doing so, the event data generating unit 25 may adjust, in accordance with a weight added to each piece of material data, at least any of a length and diction of each portion which corresponds to the material data among the text to be generated. Accordingly, for example, a sentence related to material data with a heavy weight may be made a long and detailed sentence while a sentence related to material data with a light weight can be made a short and concise sentence. It should be noted that an adjustment of a length or diction of a sentence as described above can be accommodated by providing a template to be prepared in advance with a variation in accordance with a weight of material data or providing a machine learning model with a variation in accordance with a weight of material data. However, a specific technique to be used to adjust a text is not limited to the examples described in the present disclosure.

Appendants

The explanation of the embodiments presented above has been described so that a person with ordinary skill in the field of the invention presented below can carry out the invention.

Appendant 1

A program for causing an information processing apparatus to realize:

a player position information obtaining function of obtaining, with respect to each of a plurality of players, position information of the player in the real world;

a group creating function of creating a group made up of the plurality of players; and an event data generating function of generating, based on position information of the plurality of players, event data of a game event that can be played by the group made up of the plurality of players, the event data including one or a plurality of individual conditions which is assigned to each player belonging to the group and which is to be satisfied by the player during game play.

Appendant 2

The program according to appendant 1 for realizing, in the event data generating function, a function of generating the event data including a player reaching a designated location in the real world as the individual condition.

Appendant 3

The program according to appendant 2 for realizing, in the event data generating function, a function of determining the designated location based on position information of the player obtained by the player position information obtaining function.

Appendant 4

The program according to appendant 2 or 3 for realizing, in the event data generating function, a function of generating the event data including at least obtaining an item that can be obtained when a player reaches the designated location as the individual condition.

Appendant 5

The program according to any one of appendants 2 to 4 for realizing, in the event data generating function, a function of changing the designated location related to the player based on an elapsed time or a remaining time of the game event and present position information of the player.

Appendant 6

The program according to any one of appendants 1 to 5, further realizing a position-related information obtaining function of obtaining, with respect to a position in the real world, information having a predetermined association with the position, wherein in the event data generating function, a function of generating the event data using information obtained by the position-related information obtaining function with respect to a position indicated by position information of the player is realized.

Appendant 7

The program according to appendant 6 for realizing, in the position-related information obtaining function, a function of obtaining information on a region including the position or information on a region within a predetermined distance from the position.

Appendant 8

The program according to any one of appendants 1 to 7 for realizing, in the event data generating function, a function of generating the event data including at least two or more players belonging to the group reaching a rendezvous point in the real world as the individual condition.

Appendant 9

The program according to any one of appendants 1 to 8 for realizing, in the event data generating function, a function of changing contents of the event data based on an elapsed time or a remaining time of the game event and present position information of the player.

Appendant 10

The program according to any one of appendants 1 to 9 for realizing, in the event data generating function, a function of setting mutually different in-game roles to respective players belonging to the group in the event data.

Appendant 11

The program according to any one of appendants 1 to 10 for realizing, in the event data generating function, a function of setting mutually different individual conditions to respective players belonging to the group in the event data.

Appendant 12

The program according to any one of appendants 1 to 11, further comprising an evaluation value calculating function of calculating, based on information related to a group being an event data generation object, an evaluation value with respect to each of a plurality of pieces of data for event data generation stored in advance, the data for event data generation to be used in event data generation by the event data generating function, wherein the event data generating function preferentially uses data for event data generation with a higher evaluation value among the plurality of pieces of data for event data generation to generate event data of the game event that can be played by the group being an event data generation object.

Appendant 13

The program according to any one of appendants 1 to 12, wherein in the player position information obtaining function, position information of a player is obtained from a terminal apparatus of the player.

Appendant 14

The program according to any one of appendants 1 to 13, wherein the event data includes story contents generated based on information of a player belonging to the group.

Appendant 15

The program according to any one of appendants 1 to 14 for realizing a game managing function of advancing the game event by managing an achievement status of the individual condition included in the event data.

Appendant 16

The program according to appendant 15, wherein a time limit is set to the individual condition, and in the game managing function, a function of causing, when the individual condition is not satisfied within a time limit set with respect to the individual condition, the event data generating function to change the individual condition or another individual condition is realized.

Appendant 17

The program according to any one of appendants 1 to 16, wherein the event data includes one or a plurality of group conditions to be satisfied by the group in game play.

Appendant 18

The program according to appendant 17 for realizing a game managing function of advancing the game event by managing an achievement status of the group condition and the individual condition included in the event data.

Appendant 19

The program according to appendant 18, wherein a time limit is set to the individual condition, and in the game managing function, a function of causing, when the individual condition is not satisfied within a time limit set with respect to the individual condition, the event data generating function to change the group condition, the individual condition, or another individual condition is realized.

Appendant 20

An information processing apparatus on which the program according to any one of appendants 1 to 19 is installed.

Appendant 21

A terminal program to be realized on a terminal apparatus used by a player belonging to a group made up of a plurality of players, the terminal program causing the terminal apparatus to realize:

a terminal position information obtaining function of obtaining position information of the terminal apparatus as position information of the player in the real world; and an action notifying function of notifying, based on one or a plurality of individual conditions included in event data of a game event that can be played by the group to be satisfied by the player during game play, an action that the player should take in the real world in order to satisfy the individual condition.

Appendant 22

The terminal program according to appendant 21 for further realizing an information transmitting function of transmitting information which includes position information of the player obtained by the terminal position information obtaining function which enables a progress status of the action by the player to be comprehended to an information processing apparatus that manages the group to which the player belongs.

Appendant 23

A terminal apparatus on which the terminal program according to appendant 21 or 22 is installed.

Appendant 24

A game event processing system comprising a terminal apparatus to be used by a player belonging to a group made up of a plurality of players and an information processing apparatus that manages the group, the game event processing system comprising:

player position information obtaining means which obtains, with respect to each of a plurality of players, position information of the player in the real world;

group creating means which creates a group made up of the plurality of players;

event data generating means which generates, based on position information of the plurality of players, event data of a game event that can be played by the group made up of the plurality of players, the event data including one or a plurality of individual conditions which is assigned to each player belonging to the group and which is to be satisfied by the player during game play; and action notifying means which notifies each of the players belonging to the group of an action that the player should take in the real world in order to satisfy the individual condition.

Appendant 25

An event data creating method for causing an information processing apparatus which manages a group made up of a plurality of players to create event data of a game event, wherein the information processing apparatus executes:

player position information acquisition processing of obtaining, with respect to each of a plurality of players, position information of the player in the real world;

group creation processing of creating a group made up of the plurality of players; and event data generation processing of generating, based on position information of the plurality of players, event data of a game event that can be played by the group made up of the plurality of players, the event data including one or a plurality of individual conditions which is assigned to each player belonging to the group and which is to be satisfied by the player during game play.

Appendant 26

A game event processing method to be executed by a terminal apparatus to be used by a player belonging to a group made up of a plurality of players and by an information processing apparatus that manages the group, the game event processing method comprising:

player position information acquisition processing of obtaining, with respect to each of a plurality of players, position information of the player in the real world;

group creation processing of creating a group made up of the plurality of players;

event data generation processing of generating, based on position information of the plurality of players, event data of a game event that can be played by the group made up of the plurality of players, the event data including one or a plurality of individual conditions which is assigned to each player belonging to the group and which is to be satisfied by the player during game play; and action notification processing of notifying each of the players belonging to the group of an action that the player should take in the real world in order to satisfy the individual condition.

The invention claimed is:

1. A non-transitory computer-readable recording medium having recorded thereon a program that, when executed, causes a processor to execute:

obtaining, with respect to each of a plurality of players, position information of the player in the real world;

creating a group of the plurality of players; and generating, based on the position information of the plurality of players, event data of a game event, wherein the game event is configured to be played by the group of the plurality of players, the event data are generated and sent to the respective players of the group prior to start of the game event, and include combinations of one or more individual conditions assigned to the respective players of the group to be satisfied by the respective players during game play, the combinations of the individual conditions are different among the respective players, and generating the event data of the game event includes:
  comparing attribute information associated with the event data and attribute information of the group of the pavers;
  calculating an evaluation value with respect to each of a plurality of data for event data generation stored in advance such that a higher evaluation value is given to the event data with a higher degree of coincidence of the compared attribute information; and
  using the data for event data generation of the higher evaluation value to generate the event data of the game event.

2. The non-transitory computer-readable recording medium having recorded thereon the program according to claim 1, wherein the one or more individual conditions comprise the player reaching a designated location in the real world.

3. The non-transitory computer-readable recording medium having recorded thereon the program according to claim 2, wherein generating the event data comprises determining the designated location based on the obtained position information of the player.

4. The non-transitory computer-readable recording medium having recorded thereon the program according to claim 2, wherein the one or more individual conditions comprise at least obtaining an item at the designated location.

5. The non-transitory computer-readable recording medium having recorded thereon the program according to claim 2 that causes the processor to further execute, in generating the event data, changing the designated location related to the player based on an elapsed time or a remaining time of the game event and present position information of the player.

6. The non-transitory computer-readable recording medium having recorded thereon the program according to claim 1 that causes the processor to further execute:

obtaining position-related information having a predetermined association with the position information of the player; and in generating the event data, generating the event data using the position-related information.

7. The non-transitory computer-readable recording medium having recorded thereon the program according to claim 6, wherein obtaining the position-related information comprises at least one of obtaining information on a region including the position or information on the region within a predetermined distance from the position.

8. The non-transitory computer-readable recording medium having recorded thereon the program according to claim 1, wherein the one or more individual conditions include at least two or more players of the group reaching a rendezvous point in the real world.

9. The non-transitory computer-readable recording medium having recorded thereon the program according to claim 1, wherein generating the event data comprises changing contents of the event data based on an elapsed time or a remaining time of the game event and present position information of the player.

10. The non-transitory computer-readable recording medium having recorded thereon the program according to claim 1, wherein generating the event data comprises setting mutually different in-game roles to respective players of the group in the event data.

11. The non-transitory computer-readable recording medium having recorded thereon the program according to claim 1, wherein generating the event data comprises setting mutually different individual conditions to respective players of the group in the event data.

12. The non-transitory computer-readable recording medium having recorded thereon the program according to claim 1, wherein the event data comprises story contents generated based on information of a player of the group.

13. The non-transitory computer-readable recording medium having recorded thereon the program according to claim 1 that causes the processor to further execute:

advancing the game event by managing an achievement status of the individual condition included in the event data.

14. The non-transitory computer-readable recording medium having recorded thereon the program according to claim 13, wherein
a time limit is set to the individual condition, and
in managing the game, when the individual condition is not satisfied within a time limit set with respect to the individual condition, the program causes the processor to further execute:
changing the individual condition or another individual condition.

15. The non-transitory computer-readable recording medium having recorded thereon the program according to claim 1, wherein
the event data comprises one or a plurality of group conditions to be satisfied by the group in game play.

16. The non-transitory computer-readable recording medium having recorded thereon the program according to claim 15 that causes the processor to further execute:
advancing the game event by managing an achievement status of the group condition and the individual condition included in the event data.

17. The non-transitory computer-readable recording medium having recorded thereon the program according to claim 16, wherein
a time limit is set to the individual condition, and
in managing the game, when the individual condition is not satisfied within a time limit set with respect to the individual condition, the program causes the processor to further execute:
changing the group condition, the individual condition, or another individual condition.

18. A non-transitory computer-readable recording medium having recorded thereon a terminal program to be executed on a terminal apparatus used by a player of a group including a plurality of players, the terminal program causing the terminal apparatus to execute:
obtaining position information of the terminal apparatus as position information of the player in the real world; and
notifying, based on one or more individual conditions included in event data of a game event, instructions to take actions in the real world to the respective players in order to satisfy the individual conditions, wherein
the game event is configured to be played by the group of the plurality of players,
the event data are generated and sent to the respective players of the group prior to start of the game event by an information processing apparatus configured to manage the group, and include combinations of the one or more individual conditions assigned to the respective players of the group to be satisfied by the respective players during game play,
the combinations of the individual conditions are different among the respective players, and
the event data are generated by comparing attribute information associated with the event data and attribute information of the group of the players, calculating an evaluation value with respect to each of a plurality of data for event data generation stored in advance such that a higher evaluation value is given to the event data with a higher degree of coincidence of the compared attribute information, and using the data for event data generation of the evaluation value.

19. A game event processing system, comprising:
a terminal apparatus configured to be used by a player of a group including a plurality of players; and
an information processing apparatus configured to manage the group, wherein
the game event processing system comprises a processor to execute:
obtaining, with respect to each player of a plurality of players, position information of the player in the real world;
creating the group including of the plurality of players; and
generating, based on the position information of the plurality of players, event data of a game event, wherein
the game event is configured to be played by the group of the plurality of players,
the event data are generated and sent to the respective players of the group prior to start of the game event, and include combinations of one or more individual conditions assigned to the respective players of the group to be satisfied by the respective players during game play, and
the combinations of the individual conditions are different among the respective players; and
notifying the respective players of the group instructions to take actions in the real world in order to satisfy the combinations of the individual conditions, wherein
generating the event data of the game event includes:
comparing attribute information associated with the event data and attribute information of the group of the players; and
calculating an evaluation value with respect to each of a plurality of data for event data generation stored in advance such that a higher evaluation value is given to the event data with a higher degree of coincidence of the compared attribute information; and
using the data for event data generation of the higher evaluation value to generate the event data of the game event.

\* \* \* \* \*